Feb. 13, 1962

M. MACCAFERRI 3,020,592

PLASTICIZING CYLINDERS FOR INJECTION
MOLDING AND THE LIKE MACHINES

Filed Sept. 1, 1960

INVENTOR:
Mario Maccaferri
BY Peck + Peck
ATTORNEYS.

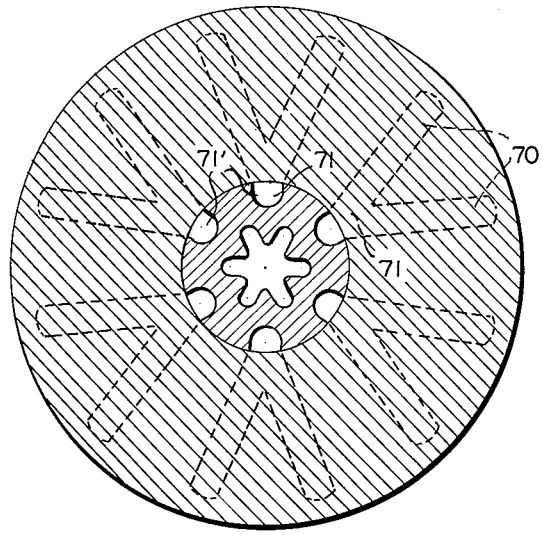
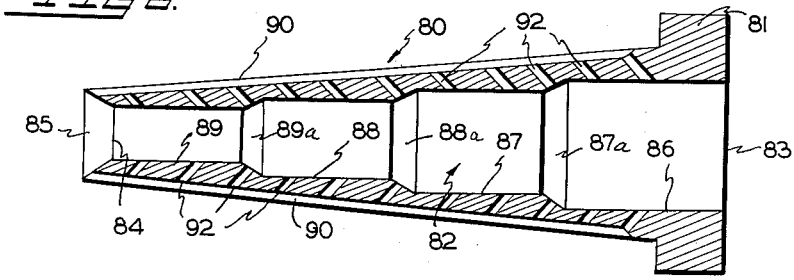
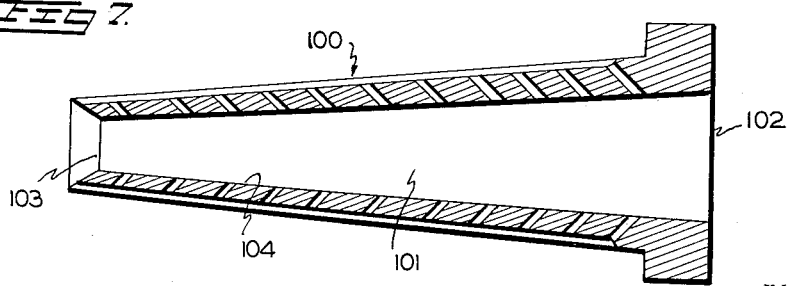

Feb. 13, 1962 M. MACCAFERRI 3,020,592
PLASTICIZING CYLINDERS FOR INJECTION
MOLDING AND THE LIKE MACHINES
Filed Sept. 1, 1960 7 Sheets-Sheet 5
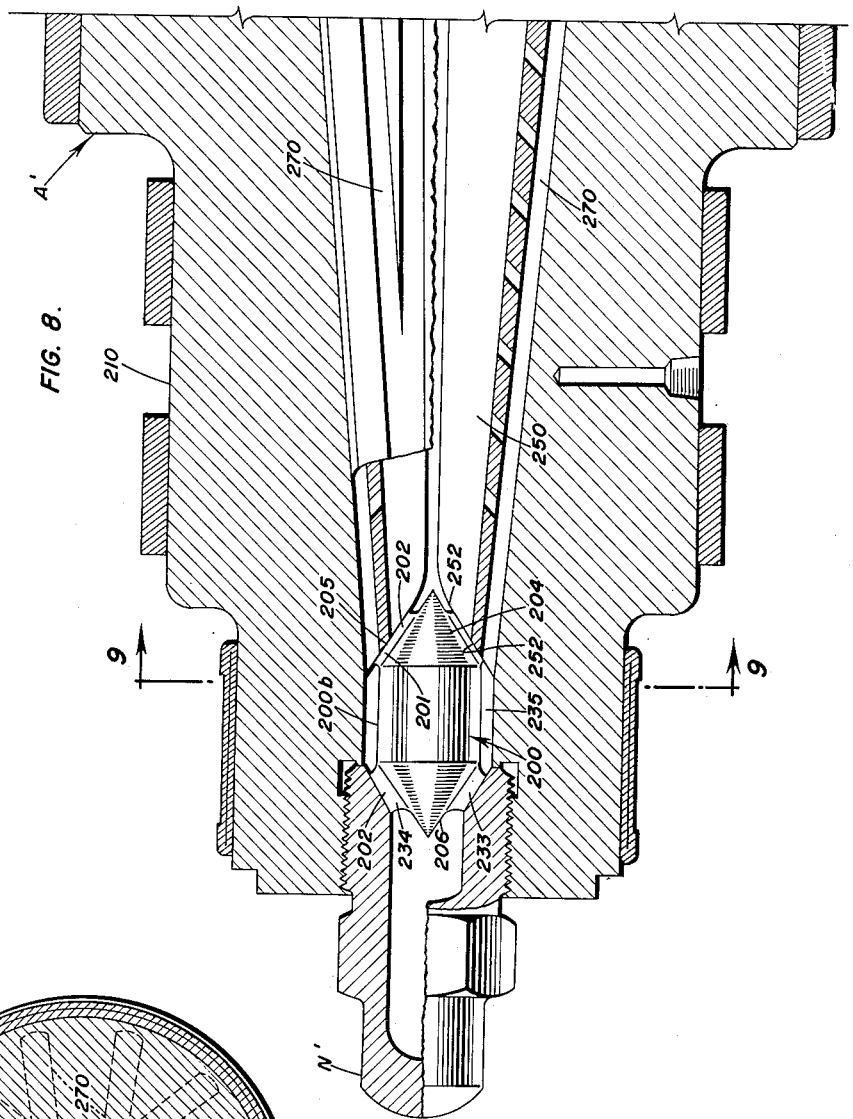
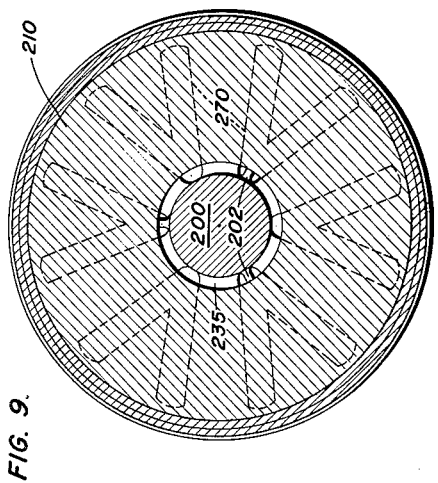
INVENTOR:
Mario Maccaferri
BY Pecks & Pecks
ATTORNEYS Feb. 13, 1962 M. MACCAFERRI 3,020,592
PLASTICIZING CYLINDERS FOR INJECTION
MOLDING AND THE LIKE MACHINES
Filed Sept. 1, 1960 7 Sheets-Sheet 6
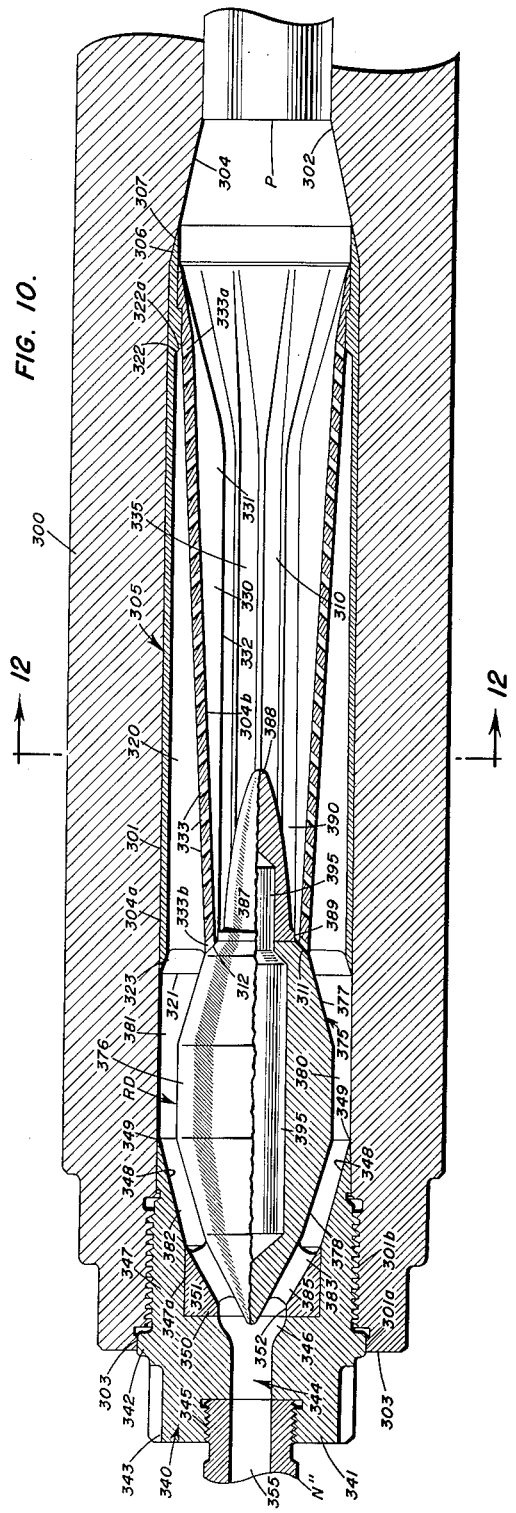
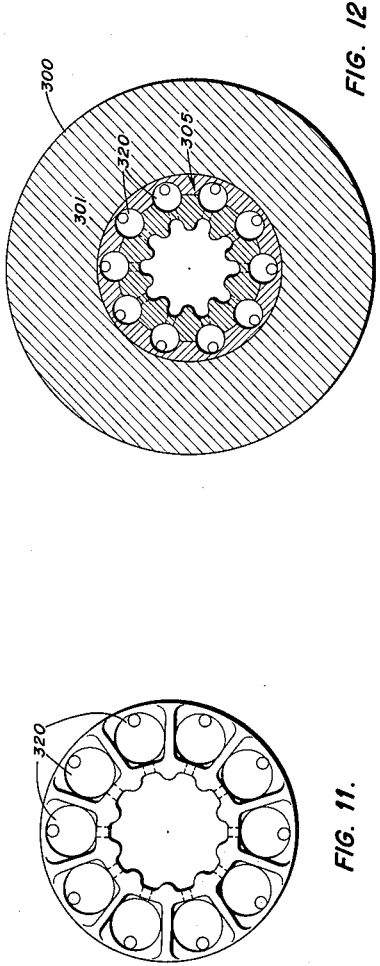
INVENTOR:
Mario Maccaferri
BY Picto + Peck
ATTORNEYS Feb. 13, 1962    M. MACCAFERRI    3,020,592
PLASTICIZING CYLINDERS FOR INJECTION
MOLDING AND THE LIKE MACHINES
Filed Sept. 1, 1960                                        7 Sheets-Sheet 7

INVENTOR:
BY
ATTORNEYS

United States Patent Office 3,020,592
Patented Feb. 13, 1962

3,020,592
PLASTICIZING CYLINDERS FOR INJECTION MOLDING AND THE LIKE MACHINES
Mario Maccaferri, 24 Redfield St., Rye, N.Y.
Filed Sept. 1, 1960, Ser. No. 57,860
11 Claims. (Cl. 18—30)

This invention relates to plasticizing cylinders for injection molding machines of the type in which a measured charge of thermoplastic material in solid and usually granular form is heated to plastic state and then injected under pressure into a mold; and the nature and objects of the invention will be readily recognized and understood by those skilled in the art in the light of the following explanation and detailed description of the accompanying drawings illustrating what I now consider to be a preferred example or mechanical expression of the invention from among various other forms, expressions, embodiments, designs, arrangements, constructions and combinations of which the invention is capable within the broad spirit and scope thereof as defined by the claims hereto appended.

This application is filed as a continuation-in-part of my copending application filed November 9, 1953, Serial No. 390,879, now abandoned, titled Plasticizing Cylinders for Injection Molding and the Like Machines.

In a widely commercially used class of injection molding machines for charging molds with melted or plasticized thermoplastic material in the quantity production therefrom of molded articles, charges of such material of predetermined volume and weight are successively forced under pressure through a so-called heating or plasticizing cylinder in which each charge is melted to a freely flowable state before discharge therefrom and injection in such melted state into a mold. One of the major problems encountered in the operation of this class of machines is to obtain uniform and complete plasticizing and melting of the charge of solid thermoplastic material within the relatively short period of time allotted for melting in the operating cycle of the machine before the melted charge is injected into the mold. As an example of the time limitation on the plasticizing step in the cycle of operation of such a machine, a generally used cycle may provide for the injection into a mold of six (6) completely plasticized charges of thermoplastic material per minute, so that only a matter of seconds is allotted for the plasticizing of each charge of the solid granular material in its passage through the plasticizing cylinder before mold injection. The efficiency of the molding operation and the quality of the resulting molded article is essentially dependent upon the complete and uniform plasticizing or melting of each charge of solid material before mold injection.

One major factor which contributes to the plasticizing problem, under the time limitation which is placed on the plasticizing step, arises from the fact that most of the thermoplastic materials and compounds thereof used for injection molding, extruding and the like processing are very good heat insulators, that is to say, poor conductors of heat. As these plasticizing cylinders are formed of heat conducting materials and the melting of the charge of solid material being forced and displaced therethrough under high pressure is effected by the transmission of heat by conduction through the walls of the cylinder with which the outermost portions of the charge of material are in contact as it flows therethrough, and as the charge is forced through a cylinder as a solid, dense mass, it follows that the inner and central portions of the mass of the charge may not have transmitted thereto sufficient heat for complete plasticizing or melting during the very limited interval of time given for the passage of the charge through the cylinder to the mold injection point. Another major factor is the magnitude of the frictional forces which are developed by the forcing under pressure of the dense mass of the solid charge in granular form into and through the plasticizing cylinder, this factor being greatly magnified by the necessity of providing a major path of flow for the charge through such a cylinder of decreasing cross-sectional areas. Various expedients have been resorted to in efforts to overcome these problems by decreasing the frictional resistance to the passage of the solid charge through the plasticizing cylinder and by increasing the amount of heat transferred to and throughout the mass of the charge during the interval of time of passage of a charge through the plasticizing cylinder. One expedient which has been widely used in the commercial art is the provision of a so-called separator or "torpedo" in the form of a streamlined member positioned and mounted within the major flow passage through the cylinder with this separator forming an annular passage therearound to thus cause the charge of material while in unmelted or partially softened form to be fed in as a relatively thin layer in contact with the heat transfer walls of the flow passage. Various other expedients are resorted to in the commercial art but each generally necessitates some form of obstructive, flow retarding and friction increasing constructions to the passage and flow of the charge of unmelted and partially softened material through the cylinder. The general result in the commercial art of these compromises by which friction has been increased in the effort to obtain a flow distribution of the solid charge through the plasticizing cylinder for more uniform and complete melting and plasticizing of the charge, has been to very greatly increase the pressures required to force a charge through the heating cylinder and then force melted plastic from that cylinder into the mold through the injection nozzle, these pressures in many instances reaching a magnitude of the order of 30,000 pounds to the square inch.

It is a primary and general object of my present invention to increase the plasticizing capacity of heating or plasticizing cylinders for melting plastics while reducing the pressure heretofore required to force a given charge of thermoplastic material in solid, granular form through and discharge the resulting melted plastic from such a cylinder of a given plasticizing capacity.

It is a further object to improve the quality of the melted charge of thermoplastic material discharged under pressure from a plasticizing cylinder by providing such a cylinder in which substantially complete and uniform melting of a charge of thermoplastic material is obtained by the time the charge has passed through the plasticizing cylinder and reached the point of pressure discharge therefrom.

Another object is to provide a design and construction of plasticizing cylinder in which the major passage through the cylinder is maintained without substantial abrupt internal obstruction or construction throughout the length of the passage through which solid and partially heat softened plastic is displaced while providing for the separation and extraction from the passage of melted plastic formed around and along the outer or peripheral surfaces of a mass or charge of plastic material therein, with the melted plastic thus extracted being forced through separate, minimum friction channels to the discharge end of the cylinder for injection discharge or extrusion therefrom.

Another object is to increase the area of the heat transmitting surfaces within and along the major flow passage through a plasticizing cylinder without developing abrupt or sharp interruption to or constriction of the passage.

A further object is to increase the area of the heat transmitting surfaces contacted by the material passing through the major flow passage by providing a system of spaced, longitudinally disposed ribs projecting radially into and along the passage with these ribs being of streamline form and so relatively arranged as to offer a minimum of frictional resistance to movement or flow under pressure of the material through the major passage of the heating cylinder.

Another object is to provide a design and construction of plasticizing cylinder in which the major flow passage therethrough is of conical form of constantly progressively decreasing cross-sectional areas from the intake end thereof to the discharge end, with a system of supply ducts leading therefrom to a plurality of channels or grooves for separating and by-passing melted portions of the charge of material being forced through the plasticizing cylinder to thereby increase the rate of melting of the aggregate charge being forced through the cylinder without increasing frictional resistance to pressure flow of material through the main passage and the channels or grooves.

Another object is to provide a plasticizing cylinder of a design and construction such that the major melting section of the cylinder presents a minimum of frictional resistance to passage or movement of the solid and partially melted masses of plastic being plasticized or melted therein with all restricted passages of the cylinder receiving therethrough under pressure only readily flowable, minimum frictional resistance generating completely melted material.

A further object is to provide a design and construction of plasticizing cylinder in which a passage restricting member is provided in position at the discharge end of the cylinder but in a location where only completely melted and readly flowable plastic is required to be pressure forced past such passage restricting member.

Another object is to provide a plasticizing cylinder having perforations along and around the walls defining the main passage or chamber opening into melted plastic receiving channels with a design and construction such that the perforations in the main passage walls constitute the only paths of discharge of melted plastic from the main passage.

Another object is to provide an improved and more efficient design of the melt flowing channels which receive melted plastic from the main passage through the perforations in the walls of the main passage.

And a further object is to provide a design and construction of plasticizing cylinder for carrying out the foregoing objects which will be of simple and readily manufactured structural and mechanical design adapted for mounting and installation as a plasticizing cylinder for various types of injection molding machines.

With the foregoing and various other objects, features and results in view which will be readily apparent to those familiar with this art, my invention consists in certain novel features in design and construction and in combination and subcombination of parts and components, all as will be for fully referred to and specified hereinafter.

Referring to the accompanying drawings in which similar reference characters refer to corresponding parts and elements throughout the several figures thereof.

FIG. 5 is a vertical transverse section through the plasticizing cylinder adjacent the discharge or injection end thereof taken as on the line 5—5 of FIG. 2.

FIG. 6 is a longitudinal sectional view through a modified form of sleeve member in which the main flow passage is formed without heat transmitting surface expanding rib members and provides therewithin a series of reduced diameter steps decreasing in internal diameters in the direction of flow.

FIG. 7 is a vertical longitudinal sectional view through another modified form of sleeve member in which the main flow passage therethrough is without ribs and is formed conical with a straight smooth, unbroken wall defining a passage of cone form of true circle cross-sections throughout the length thereof.

FIG. 8 is a view in vertical longitudinal section through another form of plasticizing cylinder of the invention incorporating therein a distributor member at the discharge end thereof.

FIG. 9 is a view in vertical transverse section taken as on the line 9—9 of FIG. 8.

FIG. 10 is a view in vertical longitudinal section through a further form of plasticizing cylinder of the invention of the type having a distributor member therein.

FIG. 11 is a view in elevation of the intake end of the sleeve member of the plasticizing cylinder of FIG. 10.

FIG. 12 is a view in vertical longitudinal section taken as on the line 12—12 of FIG. 10.

Figure 1:
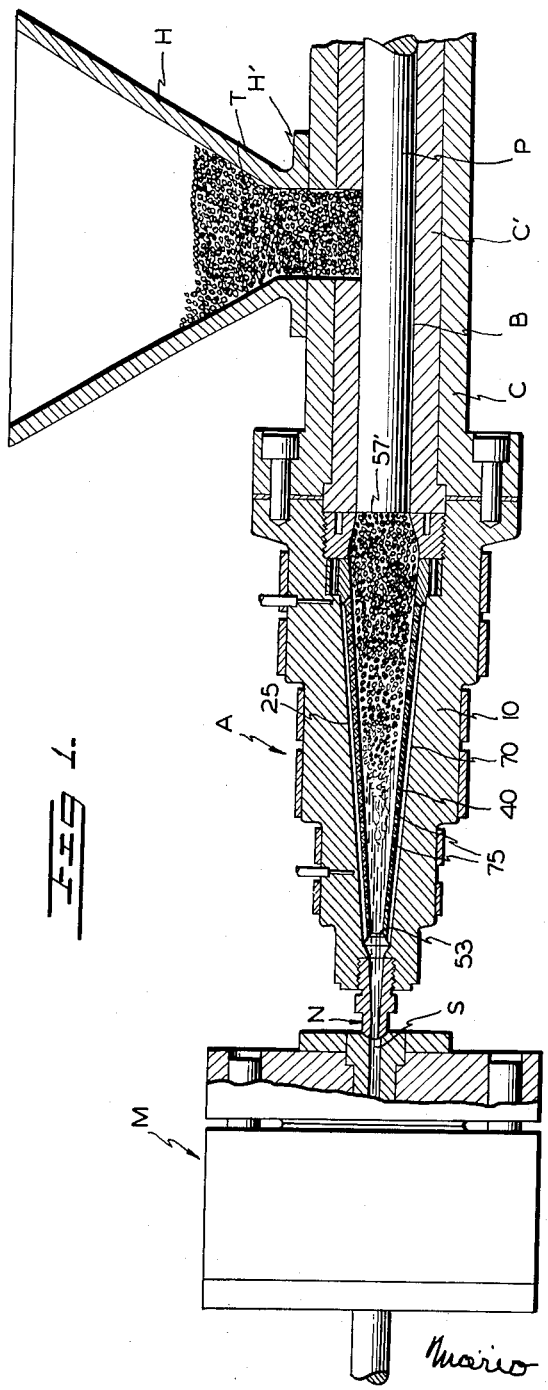
FIG. 1 is a vertical longitudinal section, more or less schematic, taken through an operative assembly of feed hopper, charging plunger, plasticizing cylinder of the present invention, and mold.

As an example I have illustrated in FIG. 1 of the drawings, the combination of one embodiment of a plasticizing cylinder of my invention as the operative plasticizing component with certain other basic components of an injection molding machine organization. As shown, such combination includes the horizontally disposed charge forming and injecting plunger P reciprocally mounted in the plunger bore or passage B through the cylinder liner C' of the plunger cylinder C. A feed hopper H for thermoplastic material in solid, granular form is mounted in association with cylinder C and discharges into the plunger bore B through the feed passage H' formed radially through the cylinder C and the cylinder liner C'. The thermoplastic material is customarily fed by gravity from hopper H. The plunger P is power reciprocated by suitable means (not shown) through a predetermined length of charge forming stroke and injecting stroke. When the plunger P is withdrawn on its charge forming stroke to a position beyond feed passage H', a measured charge of the plastic material T from the hopper H feeds by gravity into the bore C' in front of the plunger P. On the charging and injecting stroke of the plunger the measured charged of material T thus deposited in bore B is forced under pressure into and through the plasticizing cylinder of my invention, identified generally in its entirety by the reference character A, which is connected in charge receiving relation with the discharge from the plunger cylinder. The continued movement of the plunger P on its charging and injecting stroke forces the charge of material T under pressure through plasticizing cylinder A where it is melted and from that cylinder injects the melted charge under pressure through the injection nozzle N into the sprue opening S of the closed mold M with which nozzle N is associated. Upon completion of the charging and injecting stroke, the plunger P is withdrawn or retracted to position opening feed passage H' for the feed of another charge of material T from hopper H through passage H' into bore B preparatory for another charging and injecting stroke of the plunger. This cycle of operations of the injection machine is more or less standard or conventional and will be readily understood by those familiar with these types of machines.

Figure 2:
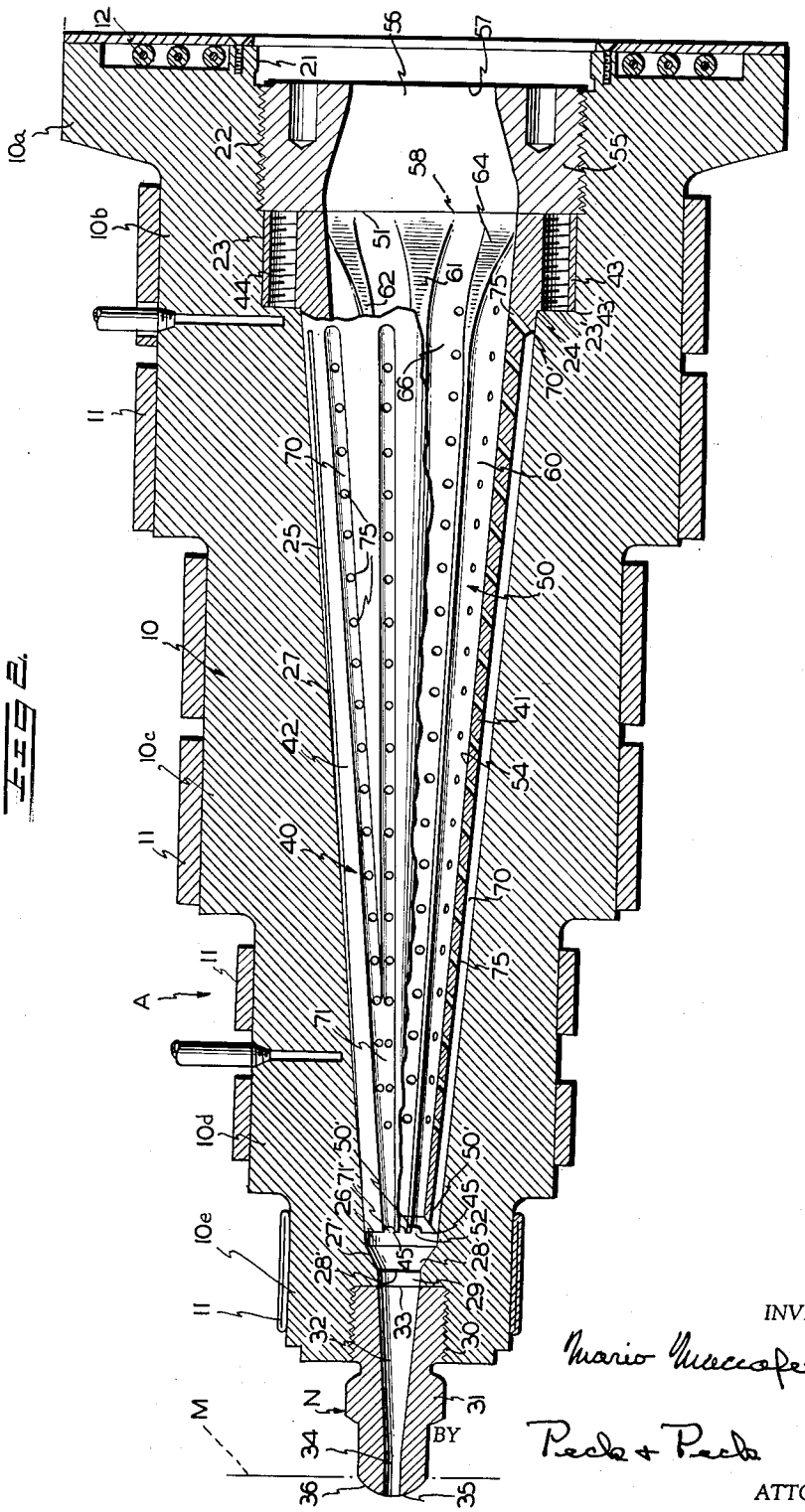
FIG. 2 is an enlarged longitudinal section through the plasticizing cylinder of the invention in the form thereof as shown in operative assembly in FIG. 1.

The plasticizing cylinder A as shown in FIG. 1 in combination with the above generally described operating components of an injection molding machine, is an embodiment of one example form of my present invention. Referring particularly to FIG. 2 of the drawings in connection with FIG. 1, the plasticizing cylinder A embodies an assembly constituting a body structure which includes the shell 10 of cylindrical form comprised of a series of reduced external diameter steps from the maximum diameter step 10a at the intake end of the shell through the progessively reduced diameter steps 10b, 10c, 10d and 10e, respectively. The body or shell 10 thus externally formed is of more or less conventional design and is provided in the assembled machine organization with the electrical heating elements or bands 11 of annular form secured in position wrapped around the exterior of each of the series of reduced diameter steps of the shell. At the maximum diameter, intake end 10a of the shell 10 there may be inset therein an annular electrical heating component 12 of more or less standard or conventional form and location as used with plasticizing cylinders for injection molding machines of the general organizational type exemplified in FIG. 1. The shell 10 which constitutes the body component of the plasticizing cylinder A of this example of my invention, is preferably formed of a material, such as steel, having good heat transfer characteristics for the transmission of heat therethrough by conduction from the various heating elements in direct heat transfer relation therewith.

The shell or body 10 of the plasticizing cylinder A at the maximum diameter end 10a thereof which is adapted to be attached and connected to the discharge end of the plunger cylinder C of the injection molding machine, is provided with a circular recess 21 in the end wall thereof for receiving and mounting therein the discharge end of the plunger cylinder assembly, this recess 21 being located in position coaxial with the shell. An internally threaded axial bore 22 extends inwardly from the circular recess 21 a distance into the shell 10, the diameter of this internally threaded bore being substantially the same as the internal diameter of recess 21 but with the minor diameter of the internal thread of bore 22 being slightly less than the diameter of the recess. This internally threaded bore 22 in this particular example extends a slight distance inwardly beyond the maximum external diameter step 10a of shell 10 into the adjacent reduced diameter step 10b thereof. A counterbore 23 of an internal diameter slightly less than the minor diameter of the internal threading of bore 22 extends inwardly from and in axial continuation of the latter bore. The inner end of the counterbore 23 is axially aligned with a circular opening 24 which constitutes the entrance end of an axially disposed conical chamber 25 which extends through the shell 10 and tapers progressively radially inwardly from the counterbore 23 to the opposite, injection end of the shell.

This conical chamber 25 is formed of progressively constantly decreasing cross-sectional areas throughout its length from the entrance opening 24 thereof at the counterbore 22 to and terminating in a circular opening 26 spaced a distance inwardly from the opposite, discharge or injection end of the shell to which is connected the injection nozzle N. There is thus provided a conical chamber 25 which tapers gradually from its entrance end to the reduced area opposite end 26 thereof with the wall which surrounds and defines and forms this conical chamber presenting a smooth unbroken and uninterrupted surface 27 throughout the length thereof. This surface 27 is precisely machined and finished to receive and engage with a shrink or press fit the complementary exterior surface of a conical sleeve member component of the assembly which is mounted therein, as will be referred to hereinafter. The conical chamber 25 is continued from the reduced diameter end 26 thereof by a chamber 28 which is formed by a rearwardly tapered conical continuation 27' of surface 27 of chamber 25, this conical surface 27' being more abruptly tapered to have a greater angle of inclination inwardly than the surface 27. Chamber 28 at its outer or rear end terminates in a circular opening 28' of reduced diameter relative to the opening 26 of conical chamber 25, and from this opening 28' a passage 29 of substantially constant diameter extends axially to and opens into an internally threaded bore 30 in the adjacent end of shell 10 into which the injection nozzle N is threaded.

The injection nozzle N includes a body 31 which has an axial bore forming a passage 32 therethrough having an inlet opening 33 through the inner end thereof of a diameter equal to the diameter of the discharge end of the passage 29 at the discharge end of shell 10, so that with the nozzle N in assembled position threaded into the bore 30, the passage 32 forms a continuation of and is in uninterrupted communication with the passage 29 of shell 10. The passage 32 gradually tapers rearwardly through nozzle N to a point spaced a distance inwardly from the discharge end of the nozzle where the passage continues to the discharge end as the reduced but constant diameter passage 34 having the injection opening 35 through the end of the nozzle. The nozzle injection end is formed with a rounded surface 36 in the usual manner for seating in a complementary recess surrounding the sprue opening S of the mold M.

In accordance with the teachings of my invention as expressed in the example embodiment herein disclosed, I provide a sleeve member 40 mounted in and substantially completely filling and occupying the conical chamber 25 of the shell 10. This sleeve member 40 includes a body 41 of conical external form and contour to present the conical exterior surface 42 therearound complementary to and of a length to be coextensive with the conical internal surface 27 which forms and defines the conical chamber 25 in the shell 10. This conical exterior surface is precisely machined and finished so as to form in effect a sealing engagement with the complementary surface 27 of chamber 25 when the sleeve member 40 is mated with and nested in assembled relation in the sleeve 10.

The sleeve member 40 at the larger diameter, intake end thereof is provided with a mounting head 43 in the form of a radially outwardly extending flange portion therearound which has an external diameter to form a relatively tight, nesting fit in the counterbore 23 at the entrance end of shell 10. Referring to FIG. 2 it will be noted that the mounting head 43 has a depth or thickness axially of the sleeve 40 which is slightly greater than the depth of the counterbore 23 so that the outer side of the head projects a slight distance inwardly into the inner end of the internally threaded bore 22 of the shell 10. The inner side 43' of head 43 engages and seats upon the complementary annular surface 23' formed around the inner end of the counterbore 23 surrounding the entrance opening 24 of the chamber 25 of the shell. Suitable tapped, transverse bores 44 may be provided at spaced intervals around head 43 for receiving a suitable tool or implement for withdrawal and removal of the head from its assembled position in the counterbore 23 in the assembly of the sleeve member in position in the shell 10. The length of the sleeve member 40 from the inner side of head 43 to the opposite, discharge or injection end of the shell 10 is such that with the sleeve member in assembled position in chamber 25, the discharge end 45 of the sleeve member is positioned within chamber 25 at a location spaced a slight distance inwardly from the outlet or discharge opening 26 which provides the reduced diameter end of the chamber 25.

The sleeve member 40 is formed to provide a generally conical form of passage 50 axially therethrough which opens at its intake, large diameter end through the head 43 and at its reduced diameter, discharge end through the end 45 of the sleeve member. The intake end of this conical passage 50 is provided by the circular opening 51 through head 43 and the discharge end thereof is formed by the reduced diameter circular discharge opening 52 through the end 45 of the sleeve member. The passage 50 is formed of progressively constantly decreasing cross-sectional areas from its intake opening 51 to a reduced diameter opening 53 which is positioned in the sleeve member 40 at a location spaced a distance inwardly from the discharge opening 52 in the end 45 of the sleeve member. This passage 50 extends axially through the sleeve member 40 and is formed and defined by the surrounding inner surface 54 of the body 41 of the sleeve member, with this generally conical form surface 54 being tapered progressively rearwardly of the sleeve member from the entrance opening 51 to the reduced diameter rear opening 53 at a taper which is more gradual and at a flatter angle of inclination than the angle of taper of the conical exterior surface 42 of the sleeve member. Thus, as will be clear by reference to FIG. 2, the thickness of the wall formed by the sleeve body 41 which surrounds the conical passage 50 is of progressively decreasing thickness from the inner side of the head 43 to the discharge end 45 of the sleeve member. The sleeve member 40 is formed of a suitable heat conducting material, preferably, as in the example hereof, a pressure cast beryllium copper, and as the sleeve member is in direct contact in assembled position thereof with the steel shell 10, it follows that heat will be transmitted from the heating units 11 of the shell by conduction directly to and through the sleeve member to the inner surface 54 thereof and that the mass or thickness of the material of the sleeve member through which this heat must be conducted to the passage 50 decreases progressively along the passage from the intake end to the discharge end thereof from which the plasticized charge is to be injected into the mold.

The conical passage 50 through the sleeve member 40 thus provides as a basic or origin form, a generally annular tapering surface of gradually decreasing cross-sectional area along its length formed for minimum friction displacement or flow of the granules of thermoplastic material constituting the charge which is to be forced through and melted in the passage, from the intake opening 51 up to the discharge opening from the passage 50 constituted by the circular opening 53. The major or primary conical form passage 50 is continued from the minimum diameter opening 53 to the enlarged diameter end discharge opening 45 by a further conical passage 50' which is tapered or flared radially outwardly and rearwardly from opening 53 to the enlarged diameter end discharge opening 45 which provides and constitutes the discharge outlet from the passage 50—50' into the discharge end of the passage 25 of the shell 10 into which it opens.

The sleeve member 40 is secured in assembled position in the shell 10 by means of a circular plug member 55 which is threaded into the tapped bore 22 in the entrance end of the shell 10. This plug member 55 is threaded in bore 22 into tight engagement with and against the head 43 of sleeve member 40 to thereby press and clamp this head rigidly between the inner face of the plug member and the seating surface 23' around the inner side of the counterbore 23 in shell 10. Any suitable or desired locking means or members (not shown) may be utilized to releasably secure the plug member 55 in position securing the sleeve member 40 against axial displacement from its assembled position tightly engaged in the conical chamber 25 of the shell member with the complementary surfaces 42 and 27 in tight, substantially sealed engagement.

The intake end 51 of the generally conical form passage 50 which opens through the head 43 of sleeve member 40, is placed in charge receiving communication with the discharge end of the plunger bore B of the liner C' of the plunger cylinder C by a bore or passage 56 which is formed extending axially through the plug member 55. This plug member passage 56 has an intake opening 57 of the same internal diameter as the internal diameter of the discharge opening 57' from the plunger bore B. The passage 56 through the plug member 55 has a discharge opening 58 at the inner or rear side thereof which has the same internal diameter as the internal diameter of the intake opening 51 of the conical passage 50 of the sleeve member. The internal diameter of the intake opening 51 of the passage 50 and the internal diameter of the discharge opening 58 of the passage 56 through the plug member 55 are the same and in this particular example equal to approximately 1⅓ times the internal diameter of the discharge opening 57' from the plunger bore B. In assembled positon in the injection molding machine, the discharge end of the plunger cylinder C, or the liner C' thereof, is received in the circular recess 21 in the entrance end of the shell 10 with the cylinder and plunger in axial alignment with the plug member 55 and the sleeve member 40, and with the discharge opening 57' in precise axial alignment with the intake opening 57 of the passage 56 through the plug member. In such assembled position the discharge opening 58 of passage 56 through plug member 55 is in precise axial alignment with the intake opening 51 of the conical passage 50 through sleeve member 40, so that there is formed by the passage 56 an unbroken and uninterrupted continuation of the conical passage 50 of sleeve member 40 up to and in charge receiving communication with the discharge opening 57' of the plunger bore B, as will be clear by reference to FIG. 2 in particular. The passage 56 through the plug member 55 progressively increases in internal diameter to provide a radially outwardly tapering passage from the intake opening 57 thereof to the discharge opening 58, that is to say, to the intake opening 51 of the conical bore 50 of the sleeve member 40. It will be noted that such passage flares outwardly from the opening 57 to the enlarged diameter opening 58 for the purpose of preventing the plastic material in the plasticizing cylinder from backing up when the plunger P is withdrawn towards the hopper H following the completion of the injection stroke.

Figure 3:
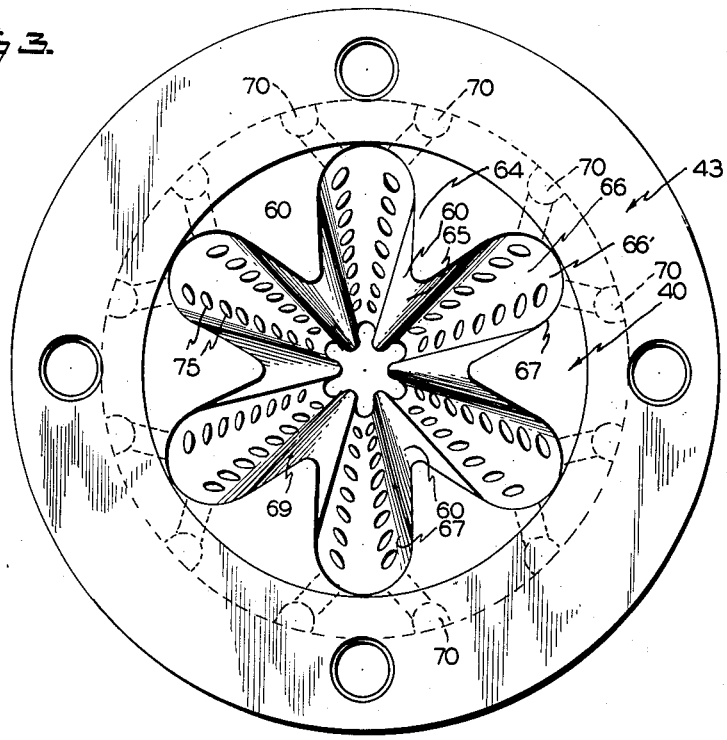
FIG. 3 is a vertical transverse section taken as on the line 3—3 of FIG. 2, showing the charge intake end of the plasticizing cylinder in end elevation.
Figure 4:
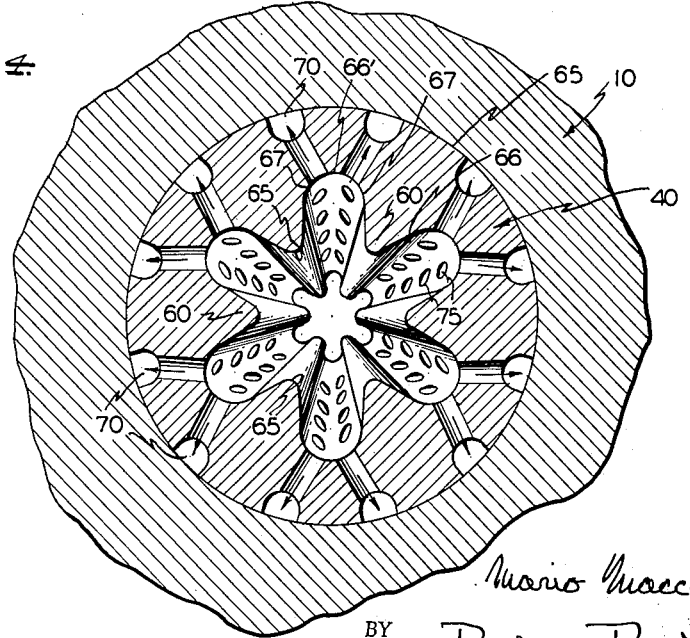
FIG. 4 is a vertical transverse section through the plasticizing cylinder taken as on the line 4—4 of FIG. 2.

With the general cone form of the base surface 54 which defines and forms the conical passage 50, as a surface of origin, I generate and develop therefrom a series of rib members 60 disposed longitudinally of and extending radially inwardly from such surface into the passage. Referring now to FIGS. 3 and 4 in particular, in connection with FIG. 2, I provide in this specific example embodiment of my invention, six (6) of these rib members cast integral with the body 41 of the sleeve member 40 and spaced apart equal angular distances around the axis of the conical passage 50. Each of these rib members 60 is of generally streamline form and extends from a location within the conical passage 50 adjacent the intake opening 51 of that passage through the sleeve member head 43. The end 61 of each rib member 60 at the intake end of passage 50 is faired into the basic conical origin surface 54 of the passage with an end contour such that the edge surface 62 at the intake end of the rib flows smoothly into and joins and merges with the surface of passage 56, being generated with a radius of curvature substantially the same as the radius of curvature on which the surface of passage 56 is generated to provide its taper from the intake opening 57 to the discharge opening 51. Each rib 60 extends longitudinally of the passage 50 to the reduced diameter discharge end opening 53 of the conical passage 50. Each rib from its forward end 61 at the intake end of passage 50 progressively constantly decreases in thickness rearwardly to the discharge opening 53 at the reduced diameter discharge end of the sleeve member. Similarly, each rib 60 has its maximum width at the intake end of the passage 50, the location of the portion of maximum width of each rib being indicated generally by the reference character 64 in FIGS. 2 and 3, and thereafter the rib progressively constantly decreases in width along the passage 50 to its opposite end located at the discharge opening 53 where it forms the end portion of the general basic cone form of the surface 54 which basically defines the conical passage 50. The inner edge 65 of each rib 60 is formed on a radius transversely thereof to provide a rounded, convex edge along and substantially throughout its length. The portion of the general surface of cone origin 54 of passage 50 which extends along and between each pair of adjacent rib members 60 is also formed on a radius transversely thereof to provide in effect a trough-like bottom or inner wall surface for the channel or space 66 extending along the passage 50 at and between the inner end base or root portions 67 of adjacent rib members.

While the rib members 60 are shown in this particular example as extending to the discharge opening 53 of the passage 50 in the sleeve member 40, the invention is not limited or restricted to such design for these rib members. If desired or found expedient, such rib members may reach zero thickness or depth a slight distance in advance of the discharge opening 53 and be smoothly faired and merged into the surface 54, so that the cross-sections along the passage between such ends of the ribs and the opening 53, and such opening itself, will be of true circular form, instead of the generally conical but fluted specific cross-sections given by the rib arrangements of the form thereof disclosed in FIGS. 1 through 5.

With the foregoing design and arrangement there is thus provided in this specific embodiment a series of six (6) streamlined rib members 60 extending longitudinally through and along the chamber 50 with a plurality of an equal number of round bottom, trough-like straight and unobstructed spaces 66 extending throughout the length of the chamber between such rib members to and discharging into chamber 50' in the discharge end of the sleeve member through discharge opening 53. In the specific example hereof the rib members 60 at the portions thereof of greatest depth adjacent the intake end of the chamber 50 may have a depth which approximates one-half (½) of the radius of the circular cross-section of the chamber at that location. While not necessarily critical, this depth of the ribs relative to the radius of the cross-section of the chamber may be substantially maintained along the progressively decreasing radii of the cross-sections of the chamber toward the discharge end thereof. With the arrangement of the illustrated example which conforms to such general dimensional relationships, it has been determined that the ribs 60 by the aggregate or total areas of their opposite side surfaces 69 and edge surfaces 65 will approximately double the heat transmitting surface area of the basic cone surface 54 if that surface be unribbed and constituted solely by a smooth, pure, truly conical surface. It will be further noted that by this arrangement of heating surface increasing ribs 60, there is no abrupt interruption to or abrupt or sharp constriction of the flow passages provided by the central axial portion of passage 50 and by the passages 66 between the rib members 60. There is thus maintained the highly essential and critical straightline flow paths by which minimum friction is developed between the mass of the solid charge being forced under high pressure through passage 50 and the heat transmitting walls with which this charge is engaged in the displacement thereof through the passage.

While the system of rib members 60 provided in the conical passage 50 contributes substantially to the plasticizing capacity of the plasticizing cylinder A, the basic feature of my present invention by which a major increase in the plasticizing efficiency of the cylinder A is obtained, is found in the provision for separating-off the layers of melted plastic formed along and around the main mass of solid under pressure in the chamber 50 and then flowing these separated-off melted portions as separate stream flows in direct heat transfer contact with the body of the shell 10. These flows of separated-off melted plastic flow into and are merged or joined with the melted plastic from the charge of plastic in the main passage 50 discharged therefrom just in advance of the injection nozzle N. This principle and feature of my invention may be carried out effectively without the provision of a system of rib members, such as the rib members 60, in the main passage 50, and the use of such rib systems is in no way essential to utilization of the principle of melting a layer of plastic along and around the outer surface of the mass or charge of plastic held under pressure in passage 50 and pressure extracting such melted plastic therefrom and separately flowing it under pressure to and joining it in chamber 28 with melted plastic from the mass or charge discharged through opening 53 from the passage 50.

The plasticizing cylinder A in the form of my invention disclosed in FIGS. 1 through 5, utilizes and implements this principle by a relatively simple, practical design and construction of the sleeve member 40 and without the necessity for design changes in the simple basic form and construction of the shell member component 10 of the plasticizing cylinder. In carrying out this feature of the invention in this particular example, I provide around the exterior or outer side of the sleeve member 40, a series of twelve (12) round bottom grooves forming flow channels 70 extending axially along the sleeve member from locations adjacent the inner side of the sleeve member head 43 to locations spaced around the discharge end of the sleeve member intermediate the reduced diameter discharge opening 53 and the enlarged diameter end discharge opening 45. I arrange these twelve (12) channels 70 in pairs with the channels of each pair being located at opposite sides of the medial plane of the trough-like bottom wall 66' formed of the general conical surface 54 of the chamber 50 which extends along and forms the inner wall of the space 66 between each pair of adjacent ribs 60. In other words, the channels 70 of each pair of channels are generally disposed in locations between the base or root portions 67 of each pair of adjacent rib members 60, as will be clear by reference to FIG. 4 in particular. The channels 70 of each pair or set of channels are inclined progressively inwardly toward each other along the sleeve member 40 from the large diameter intake end thereof toward the opposite discharge end with the channels converging and joining to provide the single channel 71 which extends to and terminates in a discharge opening 71' through the conical surface 72 formed within the discharge end of the sleeve member between the end discharge opening 52 and the inwardly spaced reduced diameter discharge opening 53 from the passage 50 proper, as will be clear by reference to FIG. 2. Thus, at the discharge end of the sleeve member 40, due to the merging and joining of the channels 70 of each pair of channels, there are but six (6) discharge openings 72 into the chamber or passage 28 from which the melted plastic from the twelve (12) channels is discharged and joined and mixed with melted plastic being discharged through opening 53 at the discharge end of the main central flow passage 50.

Each of the channels 70 and the discharge channels 71 is formed completely open throughout its full width through the conical exterior surface 42 of the sleeve member 40, to thereby provide completely straight line, uninterrupted paths of flow for the tributary streams of separated melted plastic being forced under pressure therethrough and plasticized therein. Hence, in assembled operative position of the sleeve member 40 in the shell 10 the conical exterior surface 42 including the portions 42a thereof between channels 70 and 71, of the sleeve member, is in tight, sealing engagement with and against the complementary conical surface 27 of the chamber 25 in shell 10 into which the sleeve member 40 is mated and tightly secured as by a shrink fit. By this design and construction the melted plastic which has been extracted from along and around a charge in the passage 50 and is being forced through channels 70 and 71 is placed in direct contact throughout the length of the channels with the heat transfer surface 27 which surrounds and defines the conical chamber 25. The surface 27 of the shell 10 also functions to close the channels 70 and 71 and to seal them against leakage or escape of melted plastic therefrom.

The channels 70 are each placed in melted plastic receiving communication with the main, central passage 50 through the sleeve member 40 by providing a multiplicity of feeder ducts or perforations 75 through the body 41 of the sleeve member, with these feeder ducts opening at their inner, intake ends into the chamber 50 and opening at their outer, discharge ends into the channel 70 which they are to feed. The feeder ducts 75 for each channel 70 are spaced apart substantially equal distances along and throughout the length of the channel from and between the intake end of chamber 50 to the discharge end of the channel at which the channel opens into the discharge channel 71 which is common to each pair of channels 70 in this particular example. In the embodiment of my invention as herein disclosed, each channel 70 is provided with twenty (20) of these feeder ducts 75 which are spaced equidistant apart along the length of the duct. In accordance with my invention these feeder ducts 75 are inclined into positions extending radially outwardly through the body 41 of the sleeve member in the direction of flow of the material through the main central passage 50 and through the channels 70. In this instance the angle of inclination of the feeder ducts 70 in the direction of flow may be of the order of approximately 45°. These feeder ducts 75 are each of constant internal diameter throughout their length to form smooth, straight line unobstructed flow passages. Such internal diameter may, as in this example, preferably be slightly less than the maximum width of a channel 70 at the outer side thereof. With the feeder ducts 75 so formed and arranged, a steady, minimum friction flow of melted plastic will be forced from along and around the outer portion of the mass or charge of material being displaced and retained and held under pressure through and in the main, straight flow central passage 50 by the pressure exerted on the main mass of the plastic by the injection plunger P, into and through channels 70 to and through the discharge channels 71 and from these latter channels in melted, freely flowable state through the channel discharges 72 into the chamber or passage 28 into which the discharge end of the main passage 50 discharges any melt formed from the mass of plastic in the main chamber and located at the discharge end thereof.

With the specific arrangement of the system of channels 70 of this particular embodiment where the channels 70 are grouped in pairs and converge at their discharge ends into a common channel 71, the feeder ducts 75 are arranged in sets to feed the channels, respectively, of each pair of channels 70, from the bottom or inner side of one of the trough-like spaces 66 within chamber 50 formed between the adjacent ribs 60 associated with such channels. Referring to FIG. 4 in connection with FIG. 3, it will be clear that from and along the bottom or inner wall 66' of the space or passage 66 formed between each pair of adjacent rib members 60, feeder ducts 75 extend radially outwardly through the body 41 of the sleeve member 40 from each side of such space at the base or root portions 67 of the adjacent rib members. This is to say, that the sets of feeder ducts 75 for each pair of channels 70 open into the space 66 between adjacent rib members 60 at the root portions 67, respectively, of such rib members and diverge outwardly therefrom to the channels 70, respectively, of the pair of channels positioned opposite and along the space between such adjacent rib members.

The first feeder duct at the intake end of each channel 70 is specifically identified by the reference character 75' and is positioned with its intake end located and opening into passage 50 in advance of the location at the end of the channel so that this first or intake end feed duct 75' extends at an inclination in the direction of flow to and has its discharge end opening into and through the end wall 70' of the channel. Such arrangement and relationship of the first or intake end feed duct 75' for each channel 70 performs the important function of eliminating any dead space in the intake end of a channel and the resulting pocketing of plastic in such dead space upon the completion of the injection of a charge through the plasticizing cylinder into a mold. The avoidance of dead spaces of such character in the system of tributary channels and feeder ducts therefor makes it practically possible to readily change the color of the plastic material being used if it should be desired to change during or after the completion of a molding run. In the plasticizing cylinder A of the design and construction of the present example, the multiplicity of feeder ducts 75'–75 for each channel 70 need not extend along the length of the common discharge channel 71 which is formed by the convergence at the discharge ends thereof of the pairs of channels 70 as explained hereinbefore.

The operation and functioning of the plasticizing cylinder A when operatively combined into an injection molding machine will be apparent from the foregoing descriptions and explanations which may be summarized operationally in the following manner. The injection plunger P of the machine will force a predetermined measured charge of solid plastic in granular form into and through the plasticizing cylinder A in which the charge of material will be plasticized and from which it will be injected by the pressures exerted thereon from plunger P, through the injection nozzle N and into the closed mold M. As the charge of material is forced through the main, central and straight line passage 50, the outer surface portions or layer of plastic along and around the mass thereof in direct contact with the surfaces of the sleeve member 40 and its ribs 60 will be melted and will be forced freely and with minimum friction into and through the multiplicity of ducts or perforations 75 into the channels 70 in a continuous flow during the application of the injection and molding pressures to the charge of plastic in the passage 50. This melted plastic separated and extracted from along and around the charge of plastic in passage 50 and fed into the channels 70 by the ducts 75, will be forced by the pressures acting thereon in a smooth steady flow through the channels 70 and 71 and from the latter channels through the end discharge openings 72 thereof into the chamber or passage 28 at the injection end of the sleeve member and its enclosing shell 10. The major portion of the charge of plastic material being displaced under pressure through the main passage 50 will have the outer melted portions thereof which are separated therefrom and fed through the ducts 75, continuously replaced by portions of plastic material from within the main mass of material so that there will be a constant movement of new material from the main mass into direct heat transfer contact with the heat transmitting surface areas provided by the aggregate of the areas of the side wall surfaces 69 and the edge wall surfaces 65 of the rib members 60. In this manner there is obtained a more rapid and uniform heat transfer through the body 41 of the sleeve member 40 to the charge of material passing through the main, central conical form passage 50, with resulting complete plasticizing of this charge when it reaches the discharge outlet 53 from the chamber 50. At the same time, the tributary streams of separated melted plastic being fed to the channels 70 by the feeder ducts 75 will be displaced and flowing under pressure through these channels in complete and direct heat transfer relation with the surface 27 of the shell 10, as well as with the heat conducting material body 41 of the sleeve member 40 which has the major portion of the area of its exterior surface in direct heat transfer contact with the surface 27 of the shell. And in this connection, as a result of the design and assembled relation of the shell 10 and the sleeve member 40, it will be noted that the shell 10 through its conical surface 27, which defines and forms the conical chamber 25 for receiving the sleeve member 40, is in heat transfer contact with the conical surface 42 of the sleeve member 40 throughout the entire length of such sleeve member. This relation results in rapid and uniform heat transfer directly from the shell 10 to the exterior conical surface 42 of the heat conducting material body 41 of the sleeve member 40.

Melted plastic formed within the charge of plastic in the passage 50 at the discharge end thereof is discharged therefrom into the passage 28 at the discharge end of the shell 10 and has joined and mixed therewith the streams of melted plastic discharging thereinto through the discharge openings 72 from the channels 71. Thus the measured charge of the solid granular material which has been initially injected into the intake opening 51 of the chamber 50 in the sleeve member 40 after being divided between and passing through chamber 50 and channels 70-71, is discharged into and reunited in the chamber 28 in a completely and uniformly melted and plasticized condition. From the chamber 28, this completely plasticized charge is then forced into and through the passages 32 and 34 of the injection nozzle N and injected therefrom through the nozzle discharge opening 35 into the mold M. Due to the design and construction of the main passage 50, the feeder ducts 75 and the channels 70 and 71, a basically and essentially straight line displacement and flow of both the main mass of plastic through passage 50 and the streams of melted plastic through ducts or perforations 75 and channels 70 is obtained. The divergence from the major straight-line path of displacement is by the radially outward flow of the melted plastic from around the charge through the very short, minimum length flow paths provided by the ducts or perforations 75 into the channels 70. Hence, the frictional forces are maintained at a minimum yet a uniform and complete melting and plasticizing of each charge of material forced through cylinder unit A is obtained before injection from the nozzle N into the mold. A minimum of heat is required to be supplied to cylinder A in order to obtain efficient and complete melting and plasticizing of a charge in the interval of time of its passage through the passage 50 and channels 70–71 because of the design and assembly of the shell 10 and sleeve member 40 for maximum and uniform heat transfer therethrough.

The system of heating surface extending rib members 60 in the main passage 50 of the form of my invention disclosed in FIGS. 1–5 may be eliminated, if desired, and my invention contemplates and includes such rib element elimination with the development of the sleeve member and the main passage therethrough into ribless forms. As an example of such a sleeve member without ribs in the main material flow passage therethrough I have illustrated in FIG. 6, a form of sleeve member 80 of the same general basic design as the ribbed sleeve member 40, adopted for mounting and assembly in the shell 10 as a substitute for the sleeve member 40. The ribless form of sleeve member 80 includes the mounting head 81 at the intake end thereof with a generally conical central and axially disposed passage 82 extending therethrough from the maximum diameter intake opening 83 through the head 81 to the minimum or reduced diameter discharge opening 84 at the injection end of the sleeve member. The discharge opening 84 opens into a radially outwardly flaring tapered end discharge passage 85 opening through the injection end of the sleeve member 80. The main passage 82 between the intake opening 83 and the discharge opening 84 is formed by the constant internal diameter intake section 86 and the series of progressively stepped-down internal diameter passage sections 87, 88 and 89. The intake section 86 of passage 82 is formed with an internal diameter equal to the internal diameter of intake opening 83, while the discharge section passage 89 is formed of the same internal diameter as the discharge opening 84, such diameter being constant throughout the length of such passage section. The passage sections 87, 88 and 89 are of reduced internal diameters, respectively, in the direction of flow through the sleeve member, that is, from the intake section 87 to the discharge end of the sleeve member, thus defining and constituting the generally conical and tapering main flow passage 82, as will be clear by reference to FIG. 6.

The discharge end of each passage section along the passage 82 is joined with the adjacent reduced diameter section by a radially inwardly extending annular surface inclined in the direction of flow from the section of larger diameter to the section of smaller diameter. In this manner abrupt transition of the surface defining passage 82 is avoided between the passage sections of different diameter so that a smooth, straight-line minimum friction flow of material through the passage will be obtained. In the sleeve member 80 of FIG. 6, such transition surfaces between passage sections are provided by the annular surface 87a between intake section 86 and the reduced diameter section 87; the annular surface 88a between the section 87 and the next reduced diameter section 88; and the annular surface 89a between section 88 and the reduced diameter discharge section 89.

The ribless form of main passage forming sleeve member 80 is provided with tributary flow channels 90 in the exterior conical side thereof, these channels being spaced apart therearound and extending longitudinally therealong in the same manner as the channels 70 of sleeve member 40 hereinbefore described. The channels 90 may be arranged in pairs converging into a single channel just in advance of the discharge end of sleeve member 80 in an arrangement similar to the channels 70 of sleeve member 40, or each channel may be continued to and have its discharge opening 91 through the surface of the outwardly tapering discharge passage 85, independent of and separate from the adjacent channels, as in the arrangement of the example sleeve member of FIG. 6.

A multiplicity of feeder ducts or perforations 92 are formed through sleeve member 80 spaced apart along each channel 90 with such feeder ducts being inclined radially outwardly in the direction of flow, say at an angle of inclination of the order of approximately 45° to the axis of the sleeve member in order to obtain a smooth and relatively direct flow and feed of melted plastic from the outer portions of the charge or column of plastic being displaced through passage 82, into the channels 90, as will be understood from the explanation of the arrangement and functioning of the channels 70—71 and feeder ducts 75—75' in the sleeve member 40, as hereinbefore set forth.

In another form of sleeve member of the ribless type shown in FIG. 7, the sleeve member 100 is provided with a conical main flow passage 101 therethrough of cone form constantly progressively decreasing in internal diameter from the intake 102 thereof to the reduced diameter discharge opening 103 in the sleeve member, the passage 101 thus being defined and formed by the straight surrounding cone surface 104. Except for the unbroken cone form of the passage 101 the sleeve member 100 may be considered to be identical with the form of sleeve member 80 and to include the same arrangement of tributary channels 90 and feeder ducts 92 from the main passage to the channels.

Both the sleeve member of FIG. 6 and the sleeve member of FIG. 7, in the forms thereof here shown, are adapted for mounting in a shell member 10 as a substitute for the sleeve member of the plasticizing cylinder A in the form of FIGS. 1 through 5. However, the features of the invention as embodied in either sleeve member 40, sleeve member 80 or sleeve member 100 may be expressed in other forms for use in combination and assembly with other designs of shells or equivalent components or structure to make-up the plasticizing cylinder.

While I consider the example embodiment of plasticizing cylinder A and the alternative sleeve members 40, 80 and 100 therefor, to incorporate what I presently consider to be preferred dimensional relationships as to lengths and diameters of the various flow passages and ports and as to the structure components comprised by the shell and sleeve members and associated parts, my invention is not limited to these exact dimensional relations and proportions. In the ribbed sleeve forms exemplified by the sleeve member 40 hereof, the number of ribs may be varied as well as the shape and contour and the length, width and thickness dimensions as long as the smooth, straight line flow paths are maintained in the conical main flow passage without abrupt or sharp obstruction or constriction in the passages. Similarly, the number of grooves forming the channels 70 and 71 in the conical exterior surface of a sleeve member may be varied, as well as the length, width and depth of the grooves or any one of them. And so with the feeder ducts 75 and 92 these ducts may be varied as to the number thereof utilized for each channel which such ducts are to feed and, while these feeder ducts of the selected examples are shown as of constant diameters, any or all of the ducts may be formed of tapered or cone or other internal contour or cross-sectional shapes, as may be found desirable or expedient in any particular sleeve member embodiment of my invention. The feeder ducts of the examples hereof are disclosed as inclined at an angle of 45° in the direction of flow but greater or lesser angles of inclination may be utilized as long as free feeding flow therethrough is obtained under the conditions of operation of any particular use thereof.

In the forms of plasticizing cylinders of the invention as hereinbefore described and as shown in FIGS. 1 through 7, the discharge opening 53 (FIGS. 1 through 5), the discharge opening 85 (FIG. 6) and the discharge opening 103 (FIG. 7), is in each instance unobstructed, as is the chamber 28 into which such openings discharge melted plastic from the main plasticizing passage of the cylinder. I have discovered and determined that a suitably shaped member or structure, such as a cone member, may be located in the space at the discharge end of the main plasticizing chamber between such discharge end and the intake end of the injection duct or passage that leads to and through the injection nozzle with highly efficient results in cylinder performance. Such space broadly corresponds to and provides the chamber 28 in the form of the invention of FIG. 1 which receives under pressure the melted plastic extracted from the main plasticizing chamber into the plastic melt flow channels and the melted plastic from the discharge opening at the discharge end of the main plasticizing chamber or passage of the cylinder.

I have, for example, disclosed in FIG. 8 a form of cylinder of the invention in which such a cone member 200 is mounted and positioned in a melt receiving chamber 201 formed between the discharge end 252 from the main plasticizing chamber or passage 250 of the cylinder and the intake end of the injection nozzle N' positioned in the discharge end of the cylinder A'. This member 200 is of the double cone type and is mounted and spaced in the chamber 201 by suitable radially outwardly extending mounting pedestals 202. The cone member 200 and the pedestals 202 are formed of metal of high heat conducting characteristics for transfer of heat by conduction from the cylinder assembly with which they are in direct metal-to-metal contact. In this instance the chamber 201 is somewhat elongated relative to the axial length of the chamber 28 of the form of the cylinder of FIG. 1, although the increased length of the chamber 201 is not necessarily critical but provides for a more practically dimensioned and effectively mounted cone member 200. The cone member 200 has a maximum external diameter at its intermediate or body portion 200b less than the maximum internal diameter of the chamber 201 and is mounted and positioned in the chamber by the pedestals 202 with the inner conical end 204 of the member extending into the outwardly flaring conical discharge end 252 of the main plasticizing passage or chamber 250 but spaced from and around the structure defining such outwardly flaring discharge end so that an annular unobstructed passage 205 is formed therearound with the channels 270 and the main plasticizing passage 250 freely discharging thereinto. The outer conical end 206 of member 200 is received in the outwardly flared conical intake end 233 of the nozzle N' so that an annular passage 234 is formed therearound that is unobstructed except for the streamlined, relatively thin mounting pedestals 202. An annular passage 235 is formed around the intermediate maximum external diameter body portion 200b of the cone member 200 between the latter member and the adjacent surrounding walls of the cylinder body 210, which passage 235 freely opens without obstruction at its opposite inner and outer ends into the annular passages 201 and 234, respectively, formed and provided around the inner and outer conical ends of the cone member 200.

Thus in the form of the invention of FIGS. 8 and 9 the cone member 200 is located and positioned in that section of the heating cylinder which receives only melted plastic from the plastic melt flow channels 270 along the main plasticizing chamber 250 and from such main plasticizing chamber at the restricted diameter discharge end 252 thereof. I have discovered and determined that the system of flow passages 205—235—234 around and along the cone member 200 which lead from the discharges from the channels 270 and the discharge 252 from the main plasticizing chamber offer minimum flow resistance to the passage of the melted plastic therethrough to the injection nozzle N'. Such interpositioning of the distributor or cone member in the flow path of the melted plastic to the injection nozzle N' does not contribute substantially to any pressure loss at the injection nozzle over the very low or minimum pressure loss encountered with the operation of a heating cylinder of my invention of the forms of FIGS. 1 through 7. The fluidity of the melted plastic which is discharged and delivered under pressure into the space or chamber 201 is such that it is freely flowable with the generation of minimum friction through the system of substantially unobstructed flow passages 205—235—234. A member, such as the cone member 200, in effect functions also as a retainer contributing to the holding by the tapered main plasticizing chamber 250 of the mass of plastic in the main plasticizing chamber, as well as a distributor for uniform, smooth, minimum friction flow of the melted plastic from the channels 270 and from the discharge 252 of the main plasticizing chamber, under pressure to the injection nozzle for pressure discharge therefrom into a mold or other plastic shape forming component.

In the forms of the invention of FIGS. 1 through 7, the tapering of the main plasticizing chamber of a cylinder must be at a sufficient angle to function to retain the mass of plastic charged under pressure into the main plasticizing chamber against axial displacement bodily as a mass through the chamber so as to hold the mass for the application of heat to the peripheral surfaces thereof to form layers of melt therealong and therearound for extraction under pressure into the plastic melt channels. It is considered that in the form of heating cylinder of FIGS. 8 and 9 with the use of the distributor member such as the cone member 200 in a space between the discharge from the melt channels and the main plasticizing chamber and the injection nozzle, it becomes possible to reduce the angle of taper or inclination forwardly and inwardly of the main plasticizing chamber so as to thereby reduce the friction potential from the taper of the chamber and hence reduce the potential pressure loss between the pressure at the intake of the main plasticizing chamber and the pressure at which the plastic melt reaches and is injected into the mold.

A further development of a plasticizing cylinder applying and efficiently utilizing the basic principles and features of plasticizing by melt extraction in accordance with my invention, as hereinbefore described and explained, is exemplified in the form of plasticizing cylinder of FIGS. 10, 11 and 12 of the accompanying drawings. In such form of the plasticizing cylinder a cylinder body or shell 300 of heat conducting material is provided having formed axially therethrough a bore 301 of constant internal diameter from a location spaced a distance inwardly from the intake 302 of the cylinder body at one end to the discharge end 303 through the opposite, injection end of the cylinder body. The plasticizing cylinder of the form of FIGS. 10 through 12 is designed for incorporation in a conventional or any desired type of injection molding machine as the plasticizing component thereof. Such a machine includes the usual power actuated reciprocating plunger P by which charges of plastic are forced under pressure into the plasticizing chamber of the cylinder. The intake 302 through the intake end of the cylinder of the example has an internal diameter substantially equal to the external diameter of the plunger P. The constant diameter bore 301 of the cylinder body or shell 300 is connected with and continued to the intake 302 as the radially outwardly tapered or flaring plastic receiving or intake section or mouth 304, as will be clear by reference to FIG. 10.

A tubular melt extractor sleeve member or component, identified generally by the reference character 305, is provided with an external diameter to tightly fit and be secured in the bore 301 in position extending from the inner end of the plastic receiving intake section or mouth 304 to and terminating spaced a substantial distance inwardly from the discharge end 303 of the bore at the discharge or injection nozzle end of the shell or body 300 of the cylinder. This melt extractor sleeve component 305 is in this example formed of a tubular cylindrical body of heat conducting material having the body wall 304a thereof of progressively increasing thickness from a location at the intake end thereof to the discharge end with such increasing thickness provided by forwardly and inwardly inclining or tapering the annular inner surface 304b of the body wall with the outer surface thereof having a constant external diameter to tightly fit and be received in the constant diameter bore 301 of the cylinder body in heat transfer contact therewith. At the intake end of the melt extractor sleeve component 305 the wall 304a of the body thereof is extended to form what is, in effect, an intake ring or mouth member 306 having an inwardly beveled or tapered external surface therearound complementary to and tightly engaging and sealing with the tapered wall of the intake chamber provided by bore section 304. Thus in mounted position the melt extractor sleeve component 305 has the ring or mouth 306 thereof extended a distance into the intake mouth formed by bore section 304 with the sleeve member providing axially therethrough the main plasticizing chamber 310 in axial continuation of the itnake bore section 304. The forward or discharge end of the melt extractor sleeve component 305 terminates within the body or shell 300 spaced a substantial distance inwardly from the injection nozzle mounting discharge end 303 of the cylinder body. Due to the forward and radially inward taper of the inner surface 304b of the body of the sleeve member 305 that defines the main plasticizing chamber 310, the discharge opening 311 from and coaxial with chamber 310 is of reduced diameter relative to the diameter of the intake to chamber 310 of the sleeve member at the intake ring or flange 306 thereof that is located in the intake section 304 of the cylinder body 300. In this example, for a purpose to be described hereinafter, the forward discharge end of the melt extractor sleeve component 305 is counterbored immediately around and surrounding the discharge opening 311 from the chamber 310 of the sleeve member to provide the outwardly tapered end surface 312 as clearly shown in the longitudinal sectional view of FIG. 10.

Following the principles of my invention as hereinbefore exemplified and described in connection with the forms of the invention shown in FIGS. 1 through 7, a plurality of plastic melt flow channels 320 are provided in the body wall 304a of the melt extractor sleeve component 305 extending therethrough longitudinally therealong spaced outwardly from the main plasticizing chamber 310 and spaced apart around such main plasticizing chamber. In the example cylinder I have provided ten (10) of such plastic melt flow channels spaced equidistant apart around the main plasticizing chamber with these channels all of the same length. Each channel 320 extends from a location spaced a distance inwardly from the intake end of the main plasticizing chamber 310 to and discharges through the forward or discharge end of the melt extractor sleeve component through the discharge opening 321. In accordance with one of the important features of my invention, as expressed in the plasticizing cylinder of FIG. 10, each of the plastic melt flow channels 320 is of cylindrical cross section throughout the length thereof and each is of progressively increasing internal diameter from its intake end to its opposite, forward discharge end so that each channel provides, in effect, an expanding tube tapering forwardly in the direction of plastic melt flow therethrough. Each of these channels 320 has its maximum diameter at the discharge 321 thereof and progressively decreases in internal diameter rearwardly along the length thereof from the discharge to the reduced diameter end 322 that is positioned at the intake portion of the sleeve member. Thus the reduced diameter end 322 is eccentrically positioned relative to the enlarged diameter end 321 with reference to the major longitudinal axis of the sleeve member component 325, as will be clear by reference to FIGS. 11 and 12. In addition, in this instance, the discharge 321 of each channel 320 is counterbored to provide the outwardly flaring or tapered and bell-like discharge mouth 323.

In order to substantially increase the heating surface area contacted by the mass of plastic in the main plasticizing chamber 310 of the melt extractor sleeve component, I provide a plurality of longitudinally disposed rib members 330 spaced apart around and extending distances radially inwardly from the inner surface of the body of the sleeve member. In this example I provide ten (10) of such rib members located in positions disposed along and between the spaced melt channels 320 with each of these ribs starting at zero depth at the intake end of the melt extractor sleeve component and progressively increasing in depth to a location at 331 of maximum depth spaced a distance inwardly from the intake end of the sleeve component. From the location 331 each rib member then extends forwardly to the discharge end 311 with the inner edge of the rib member parallel with but spaced from the axis of the sleeve member, so that, due to the inward taper of the inner surface of the body of the sleeve member, each rib thus progressively decreases in depth forwardly from the location 331 to the discharge opening 311. The rib members 330 are spaced apart around the main plasticizing chamber 310 with the inner edges 332 thereof that extend between the locations 331 and the discharge end 311 of the main plasticizing chamber parallel and spaced apart to thus form a central passage 335 unobstructed longitudinally throughout the length of the main plasticizing chamber 310 for minimum friction displacement of plastic into and through the main plasticizing chamber.

Following the principles of my invention, as hereinbefore explained and described in connection with the forms of the invention of FIGS. 1 through 7, a plurality of perforations or ducts 333 are provided through the sleeve body wall along and between each pair of adjacent rib members 330 opposite the plastic melt flow channel 320 along and between such channel for passage of plastic melt therethrough from along and around the outer surface of a mass of plastic in the main plasticizing chamber into the plastic melt channels 320. In the instant example such perforations or ducts are spaced equidistant apart along the length of a plastic melt channel and are inclined toward the discharge ends of the channels in the direction of melt flow therethrough. In the illustrated cylinder of the form of FIG. 10, twenty-one (21) of such perforations or ducts are provided along each plastic melt channel with the duct 333a at the intake end of a channel having its forward wall flush with the end wall 322a of the channel and the perforation or duct 333b at the discharge end of the channel opening through the end edge of the body of the sleeve member.

A closure head, end cap or plug member identified generally by the reference character 340 is mounted and positioned in the discharge end 303 of the shell or body 300 of the cylinder. This head or plug member 340 includes the cylindrical body 341 having intermediate its ends the external flange 342 therearound with the body at one side of said flange providing the injection nozzle mounting base 343 and at the opposite side of said flange providing the externally threaded, tubular shank 347 for mounting the closure head member in the discharge end of the body or shell 300. An axial bore 344 extends through the member 340 and terminates in the nozzle mounting base 343 in the internally threaded counterbore 345 which opens through the outer side of the member 340. The bore 344 continues rearwardly through the shank 347 from the enlarged diameter intake section 346 as the enlarged diameter counterbore 347a, with this counterbore then extending rearwardly through the shank as the outwardly tapering bore section 348 which terminates in an annular knife edge 349 constituting the rear end edge of the shank and of the closure head or plug member 340. The internal diameter of the rear enlarged diameter opening through the rear end of shank 347 is substantially the same as the diameter of the bore 301 of the cylinder body so that the knife edge 349 smoothly merges the rear end of the shank into the surface of the body defining bore 301.

An annular insert 350 is mounted in the bore section 347a in the shank 347 and this annular insert member is provided with an outwardly and rearwardly tapered inner surface 351 which has a slightly sharper angle of taper than the angle of taper of the bore 348 but which joins and merges into the bore 348 in a smooth connection therewith. The tapered surface 351 provides a bore which at its forward end is extended as a relatively short section 352 having the same internal diameter as the diameter of the inner, intake end of the intake section 346 of the bore 344 through the member 340.

The bore 301 through the body 300 is provided with a counterbore 301a at its outer discharge end. The bore 301 is internally threaded at 301b for a distance inwardly therefrom said counterbore. The discharge end closure head or plug 341 is mounted in the discharge end of the bore 301 by threading the shank 347 thereof into the internal threading 301b of bore 301 until the flange 342 of member 340 is received in the counterbore 301a.

The flange 342 has an external diameter substantially equal to the internal diameter of the counterbore 301a so as to have a close sliding fit therein. Thus in mounted position the closure head member 340 provides by the bores 348—351—352—346 and 345 a continuous and uninterrupted flow passage for conducting plastic melt under pressure to a suitable injection nozzle N" mounted in the counterbore 344 with the plastic melt injection duct or passage 355 of such nozzle in axial continuation of the passage provided by the bore 345.

Thus with the melt extractor sleeve component 305 and the closure head member 340 in assembled position in the cylinder body bore 301, there is formed and provided between the forward discharge end of the sleeve component and the rear intake end of the bore 344 through the closure head member, a plastic melt receiving and distributing chamber RD which in the instant example has a length of approximately one-third (⅓) of the length of the assembled cylinder body and end head member 340. It is to be further noted in this connection that in this specific example form of cylinder of the invention, the melt extractor sleeve component 305 has a length equal to approximately the order of two-thirds (⅔) of the total length of the axially aligned bores 304 and 301 and the receiving and distributing space or chamber RD. In this instance the plastic melt receiving and distributing chamber RD has a general shape and form of a double cone due to the forwardly and inwardly tapering bores 348 and 351 at the forward end of chamber RD and the rearwardly and inwardly tapering surfaces formed by the counterbore 312 at and around the discharge end of the melt extractor sleeve component.

Following the principles of the invention as expressed in the form of melt extractor plasticizing cylinder of FIG. 10, I provide a retaining and distributing member 375 of heat conducting material having the general form of a double cone and I mount this member 375 in the chamber RD in axial alignment with and between the axially aligned melt extractor sleeve component 305 and closure head member 340. The distributing member 375 includes an intermediate body portion of maximum diameter 376 and the rearwardly extending cone portion 377 at the rear end and the forwardly extending cone portion 378 at the opposite, forward end thereof. The length of member 375 is such that the rear end of the rear cone section 377 extends into the tapered discharge end of the plasticizing sleeve member 305 with the annular tapered surfaces of cone section 377 having a double taper complementary with and seating against the adjacent double taper surface making up the tapered discharge end of the sleeve member. Thus with the member 375 in mounted position the inner cone section 377 thereof closes the open discharge end of the main plasticizing chamber 310 of the sleeve member 305 and also closes the rear, open sides of the perforations or ducts 333b at the discharge end of the sleeve member so that the only discharge from the chamber 310 is through the perforations or ducts 333a—333—333b. The forward cone section 378 of member 375 has a double taper corresponding to the double taper provided by the surfaces 348 and 351, respectively, of shank 347 and the insert member 350 with the apex of cone member 378 extending a slight distance into the enlarged diameter intake section 346 of the axial passage formed by the bore 344 through the closure head member 340.

The external diameter of the intermediate or body portion 376 of member 375 is less than the internal diameter of the bore 301 through the cylinder body 300 so that there is formed around body 376 an annular flow passage 380. The angle of taper of the rear cone section 377 from the body 376 is such that an annular passage 381 is formed therearound between such cone section and the surface defining the bore 301 extending rearwardly from and in unobstructed communication with the flow passage 380. The annular passage 381 at its rear end has a radial width approximately equal to the internal diameter of each channel 320 at the discharge end of the latter and is in open unobstructed discharge receiving communication with the discharge ends of the channels 320. The passage 381 progressively decreases in radial widths to and discharges into the annular channel 380. The channels, therefore, open at their discharges 321 directly into and at spaced intervals around the flow passage 381 that surrounds the rear cone section 377 of member 375. The angles of taper of the forward cone section 378 are such that flow channels 382 and 383 are formed therearound between the tapered surface 348 of shank 347 and the tapered surface 351 of the insert member 350 of the end closure head 340. These annular passages 382 and 383 around the cone section 378 are in unobstructed communication and form, in effect, a single annular flow passage around the forward cone section 378 of the member 375.

The distributing cone member 375 is, of course, mounted and positioned at the rear end thereof by the seating of the conical surfaces thereof on and against the forward discharge end of the melt extractor sleeve component 305. At its forward end the distributing member 375 is mounted and positioned by pedestals 385 of heat conducting material which may be formed or provided on conical section 378 and which extend radially outwardly therefrom into seated position on and against the tapered surface 351 of the insert member 350 in the head member 340. These pedestals 385 are stream-lined for minimum resistance flow of melt therepast and are located on cone section 378 spaced equidistant apart therearound. While any number of pedestals 383 may be provided, it is preferable that a minimum number, say three (3) thereof, be used for minimum obstruction of the flow passage 383.

The rear end of the rear conical section 377 of distributing member 375 is cut off so that this section becomes frusto-conical in form and provides the flat planar base surface 387. A tail member 388 of elongated conical or stream-lined form is provided with a base 389 which is suitably mounted and secured on base 387 with this tail member coaxial with member 375. The tail member 388 extends rearwardly into the main plasticizing chamber 310 and is of progressively decreasing external diameters to form the annular chamber 390 therearound which progressively decreases in radial depth to the base 389 of the tail member. The diameter of the base 389 is greater than the maximum external diameter of the tail piece 388 so that this base closes the discharge end of the passage 335 formed between the spaced inner edges 332 of the rib members 330. The passages formed between the rib members 330 are closed by the inner end of the rear cone section 377 of the distributing member 375. In this manner the rear discharge end of the plasticizing chamber 310 is closed, leaving only the perforations or ducts 333 for discharge of plastic melt from the chamber 310 to the plastic melt flow channels 320.

Preferably, although not essentially, the distributing member 375 is provided with an axial bore extending thereinto through the base 387 and the tail member 388 is also provided with an axial bore extending a distance thereinto through its base 389. A solid bar member of copper 395 is inserted and contained in the aligned axial bores of the members 375 and 388 and thus forms and provides a core of high heat conductivity.

In the operation of a melt extractor plasticizing cylinder of the form of the invention of FIGS. 10 through 12, plasticizing or melting heat is suitably applied to the cylinder body or shell 300 for conduction therearound and through the outer wall of the melt extractor sleeve component 305 to the outer or peripheral surface of a mass of plastic forced and held under pressure in the main plasticizing chamber 310. Such heat may be applied in any desired manner, such for example as by the usual heating bands 11 as shown in FIG. 2. Plastic charges in solid, granular form are forced by the plunger P under pressure into and through intake 302, intake passage or chamber 304 and main plasticizing chamber 310, a mass of such plastic being maintained in the plasticizing chamber held against displacement bodily axially of the chamber as a mass by the retainer and distributor cone member 375 and its tail component 388. The mass or charge of plastic in chamber 310 is held under pressure with its peripheral or outer surfaces in direct contact with the heated inner surface of the sleeve member or component 305 so that heat is directly transmitted to such surfaces by the sleeve member and the heat conducting rib members 330. As layers of plastic are melted along and around the mass of plastic in chamber 310 by the direct conduction of heat to the plastic mass by the surfaces of the sleeve member and its ribs 330, this plastic is pressure forced through the perforations or ducts 333 and thus extracted and discharged into the plastic melt flow channels 320. Still under the pressure from the power actuated plunger P, this plastic melt is forced forwardly through channels 320 with minimum frictional resistance due to the expanding diameters of such channels along their length, and this melted plastic discharges under pressure through the channel discharges 321 into and through the annular flow passage formed by the connected and communicating passages 377, 376 and 382 along and around the retaining and distributing cone member 375 to the enlarged diameter intake mouth or passage of passage 344 through the head member 340. The melted plastic is forced under pressure from passage 344 through the melt injection passage 355 in the injection nozzle N''.

With the construction, arrangement and mounting of the relatively elongated retaining and distributing cone member 375, the mass of plastic is held or restrained against movement as a mass in the main plasticizing chamber 310 and with the discharge from passage 310 completely closed by member 375 only melted plastic is pressure forced and flows from chamber 310 through the perforations 333 into the channels 320 and is delivered into the annular plastic melt flow passages formed around member 375. Of course, as plastic melt is radially removed from along and around the mass of plastic in chamber 310, the pressures on the mass in that chamber cause radial outward displacement of unmelted or partially melted or softened plastic from the central portions of the mass to the peripheral portions thereof to replace the extracted and withdrawn plastic melt. This extraction of plastic melt from the peripheral portions of the mass in chamber 310 and the replacement thereof by radial movement of plastic from the inner portions of the mass is effected by the charging and injection strokes of the piston P and on each injection stroke a completely and uniformly plasticized charge constituted by the plastic melt is injected from the cylinder through the injection nozzle N''. Due to the fact that substantially only melted plastic is moved and displaced forwardly through the channels 320 and through the annular flow passages along and around the retaining and distributing member 375, and further due to the design of the channels 320 and such flow passages for minimum frictional resistance to flow of melt, this form of the cylinder of the invention has a minimum of pressure loss at the injection nozzle with melting of plasticizing carried on at a relatively high rate of speed while obtaining at the nozzle a uniformly and completely plasticized charge for injection into a mold.

In the form of the melt extractor sleeve members of FIGS. 1 to 7, and of FIGS. 8 and 9, the melt flow channels are open along their outer sides but are closed by the wall of the cylinder body or shell when a sleeve member is assembled therein. The flow channels 70 of FIG. 1 and the flow channels 270 of FIG. 8, thus provide the sharp corner edges 70a and 270a therealong which form sharp angles with and along the inner surface of the bore of the sleeve member in which mounted. Such construction lends itself to entrapment and residue of plastic in such angular edges along each flow channel where the opposite side walls of the channel meet and join with the inner surface of the passage or bore through the cylinder body or shell. Plastic that is thus trapped and remains at the opposite edges of a flow channel along the inner surface of the cylinder body bore may decompose and contaminate plastic flowing through the channels or may discolor melt of a different color following a change of plastic material being plasticized.

Figure 14:
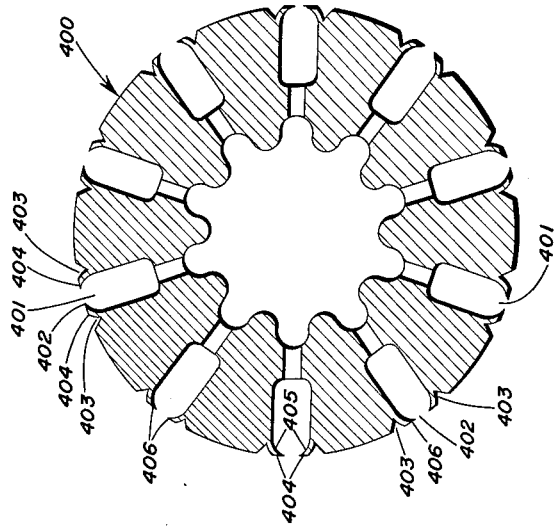
FIG. 14 is a transverse section through a sleeve member of the form of FIG. 10 showing the modified form of flow channels of FIG. 13 therein.
Figure 13:
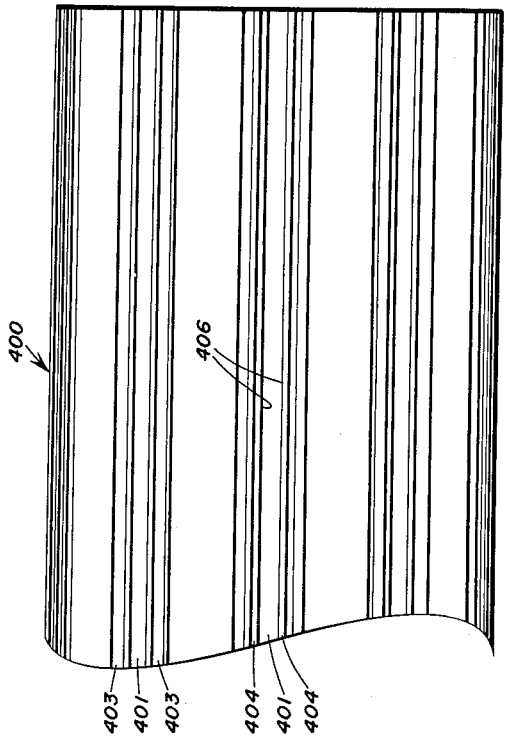
FIG. 13 is a view in side elevation of a portion of a melt extractor sleeve member of the form of FIG. 10 showing a modified form of melt flow channel.

In accordance with a further feature of my invention I have provided a construction of melt extractor sleeve member by which the sharp edges and angular corners along the opposite sides of an open side channel of generally rectangular cross section in such a member are eliminated. Referring to FIGS. 13 and 14 of the drawings, an example sleeve member 400 is shown having the plastic melt channels 401 therein extending longitudinally therealong. Each of the melt flow channels 401 is of generally rectangular cross section and has the open outer side 402 through the outer side of the sleeve member substantially throughout the length of the channel. In the specific example hereof, a relatively narrow shallow depth, V-shaped groove 403 is milled, broached, cast or otherwise suitably formed in the outer side of the sleeve member 400 in immediate proximity to and along each outer side edge portion of a flow channel 401, thus forming the relatively thin flange walls or lips 404 along opposite sides of the opening 402 of the flow channel through the sleeve member. The lips or flange walls 404 are then bent and curved inwardly toward each other to thus form the inner surfaces thereof on a radius to provide the concave, rounded edges 405 along the opposite sides of a flow channel 401 with the inwardly projecting and facing sharp or knife edges 406 spaced apart to provide the channel side opening 402 therebetween.

Thus when the sleeve member 400 with the flow channels 401 therein so formed is mounted in assembled position in a cylinder body, such as the body 300 of FIG. 8, the inturned lips or walls 404 merge or fair into and smoothly join the inner surface of the bore in the cylinder body in which the sleeve member is mounted and no sharp angled corners between the sleeve member and cylinder body are present along the outer sides of the flow channels for the entrapment therein of plastic flowing therethrough.

It will also be evident from the foregoing description and explanation of the invention and the several features thereof, that various changes, modifications, variations, eliminations, substitutions and additions might be resorted to without departing from the broad spirit and scope of my invention and hence, I do not intend or desire to limit my invention in all respects to the exact and specific illustrative examples thereof herein presented and described, except as may be required by intended limitations thereto appearing in any of the claims hereto appended.

What I claim is:

1. Plasticizing apparatus of the melt extractor type including, in combination, a plasticizing cylinder structure of heat conducting material having a main passage extending axially therethrough with an intake opening coaxial therewith at one end and a discharge opening therefrom coaxial therewith at the opposite end; said discharge opening being of reduced diameter relative to said intake opening and said main passage tapering from said intake opening to said reduced diameter discharge opening at a substantially constant angle of taper providing a straight-line flow passage of progressively decreasing internal diameters from said intake opening to said reduced diameter discharge opening; said cylinder structure having therein a plurality of flow channels spaced radialy outwardly from, spaced apart around and extending longitudinally along said main passage throughout substantially the length thereof between locations adjacent said intake opening to locations at said discharge opening; said cylinder structure also having therein a multiplicity of radially disposed small diameter openings therethrough relatively closely spaced apart along each of said channels throughout the lengths of the latter in communication between said main passage and said channels; said cylinder structure closing said channels at the ends thereof adjacent said intake opening and said channels at the opposite ends being open for discharge therefrom; and said multiplicity of openings constituting the sole discharge openings into said channels.

2. Plasticizing apparatus of the melt extractor type including, in combination, a plasticizing cylinder structure of heat conducting material having a main passage extending axially therethrough with an intake opening coaxial therewith at one end and a discharge opening coaxial therewith at the opposite end; said cylinder structure having therein a plurality of flow channels spaced outwardly from, spaced apart around and extending longitudinally along said main passage from locations adjacent said intake opening to and terminating in inner ends located adjacent but spaced a distance inwardly from said discharge opening; said main passage between the locations of said inner ends of said flow channels and said discharge opening providing a melt receiving chamber; said inner ends of said flow channels being open for discharge of melt therethrough into said melt receiving chamber; said cylinder structure also having therein a multiplicity of radially disposed, small diameter openings therethrough relatively closely spaced apart along each of said channels throughout the lengths of the latter for discharge of melt therethrough from said main passage into said flow channels; said cylinder structure closing said flow channels at the ends thereof located adjacent said intake opening of said main passage; and said multiplicity of small diameter openings constituting the sole discharge opening into said flow channels.

3. Plasticizing apparatus including, in combination, a plasticizing cylinder structure having a main passage extending therethrough with an intake opening coaxial therewith at one end and a discharge opening coaxial therewith through the opposite end of reduced diameter relative to the diameter of said intake opening; said main passage being tapered at a constant angle of taper from said intake opening to said discharge opening; said cylinder structure having a plurality of flow channels spaced radially outwardly from, spaced apart around and extending longitudinally along said main passage at constant angles of inclination radially inwardly from locations adjacent said intake opening to locations adjacent said discharge opening; said cylinder structure also having a multiplicity of radially disposed, small diameter openings closely spaced apart along each of said channels throughout the lengths of the latter in communication between said passage and said channels; said cylinder structure closing said channels at the ends thereof adjacent said intake opening; and said channels at the ends thereof adjacent said discharge opening having discharge openings therethrough.

4. Plasticizing apparatus including, in combination, a cylinder structure of heat conducting material having a main passage therethrough with an intake opening at one end and a discharge opening at the opposite end; said intake opening and said discharge opening being coaxial with said passage and said discharge opening being of substantially reduced diameter relative to the diameter of said intake opening; said main passage being tapered at a constant angle of taper from adjacent said intake opening to said discharge opening; a plurality of rib members of heat conducting material on said cylinder structure extending radially into said main passage; said rib members extending substantially throughout the length of said main passage with their inner edges spaced apart throughout the lengths thereof forming therebetween a central unobstructed passage; said ribs forming therebetween straight, unobstructed passages open throughout their lengths into said central passage; said cylinder structure providing closed walls at and throughout the lengths of the outer sides of said passages between said rib members; said cylinder structure having flow channels therein spaced from, spaced apart around and extending along said main passage throughout substantially the length thereof from locations adjacent said intake opening to and in discharge communication with said discharge opening; said flow channels being located opposite said passages between said rib members; and said cylinder structure having a multiplicity of holes therein located between said rib members closely spaced apart along each of said channels and extending radially through said closed wall outer sides of said passages between said rib members.

5. Plasticizing apparatus including, in combination, a cylinder structure of heat conducting material having a main passage extending therethrough with an intake opening at one end and a discharge opening at the opposite end; said cylinder structure having flow channels therein spaced from, spaced apart around and extending longitudinally along said main passage throughout substantially the length thereof from locations immediately adjacent said intake opening to locations immediately adjacent said discharge opening; said channels at the ends thereof adjacent said discharge opening being open for discharge therefrom to said discharge opening; a plurality of rib members of heat conducting material on said cylinder structure within and extending radially into said main passage; said rib members extending throughout substantially the length of said main passage and having the inner longitudinal edges thereof spaced apart forming therebetween a central unobstructed passage in said main passage; said rib members being spaced apart around said main passage forming therebetween straight unobstructed passages open throughout their lengths at their inner sides into said central passage; said cylinder structure providing closed walls at the inner sides of said passages between said rib members throughout the lengths thereof; and said cylinder structure having a multiplicity of openings therein located between said rib members relatively closely spaced apart along and throughout substantially the length of each channel extending radially through said closed walls at the outer sides of said passages between said rib members placing said passages in communication with said channels.

6. Plasticizing apparatus including, in combination, a cylinder structure of heat conducting material having a bore extending therethrough with an intake opening at one end and a discharge opening at the opposite end; said intake opening and said discharge opening being coaxial with said bore and said discharge opening having a diameter substantially reduced relative to said intake opening; said bore being tapered from adjacent said intake opening to said discharge opening; a sleeve member of heat conducting material mounted in and extending through said tapered bore; said sleeve member having a tapered exterior form complementary to and tightly fitting in said tapered main bore in heat transfer engagement with said cylinder structure throughout the length of said sleeve member; said sleeve member extending through said bore between a location immediately adjacent said intake opening and a location at the opposite end of said cylinder structure immediately adjacent said discharge opening; said sleeve member having a plasticizing passage extending axially therethrough with an intake opening through the end thereof adjacent said intake opening of said cylinder structure and a discharge opening of small diameter relative to the diameter of said intake opening at the opposite end of said sleeve member; said discharge opening of said sleeve member being located adjacent and in communication with said discharge opening of said cylinder body; said passage through said sleeve member being tapered at a constant angle of taper from said intake opening to said small diameter discharge opening; a plurality of rib members of heat conducting material on said sleeve member within said tapered plasticizing passage extending distances radially thereinto and spaced apart therearound; said rib members extending throughout substantally the length of said plasticizing passage and having their inner edges spaced apart, forming therebetween a central, unobstructed passage; said rib members forming therebetween straight, unobstructed passages having closed walls formed by said sleeve member throughout the lengths of the outer sides of said passages and being open along the opposite inner sides throughout the lengths thereof into said central passage; said cylinder structure and said sleeve member having channels therebetween spaced radially outwardly from, spaced apart around and extending along said sleeve member throughout substantially the length thereof from locations immediately adjacent said intake opening of said sleeve member to and in discharge communication with said discharge opening at the opposite end of said sleeve member; and said sleeve member having a multiplicity of relatively small diameter holes therein located between said rib members, closely spaced apart along each of said channels throughout the lengths thereof and extending radially through said closed wall outer sides of said passages between said rib members.

7. Plasticizing apparatus of the melt extractor type including, in combination, a plasticizing cylinder structure of heat conducting material provided with an intake opening through one end and a discharge opening through the opposite end thereof; said cylinder structure having a main plasticizing chamber extending axially inwardly from said intake opening to and providing an inner end at a location spaced a distance inwardly in said cylinder structure from said discharge opening; said main plasticizing chamber at said intake opening being coaxial and in communication with said intake opening and at its said inner end having an opening therethrough coaxial with said main plasticizing chamber; said cylinder structure having therein a plurality of channels spaced radially outwardly from, spaced apart around and extending longitudinally along said main plasticizing chamber throughout substantially the length of the latter; said cylinder structure also having therein a multiplicity of radially disposed, small diameter openings therethrough relatively closely spaced apart along each of said channels throughout the lengths of the latter for flow of melt therethrough from said main plasticizing chamber into said channels; said cylinder structure providing therewithin a melt receiving chamber between said discharge opening and said inner end opening of said main plasticizing chamber; said channels being open at the ends thereof adjacent said melt receiving chamber for discharging melt therefrom into said melt receiving chamber; means closing the inner end opening of said main plasticizing chamber against flow of plastic therethrough to said melt receiving chamber; said cylinder structure closing said channels at the ends thereof located adjacent said intake opening of said main plasticizing chamber; said multiplicity of openings constituting the sole flow openings into said channels; and said channels constituting the sole communication between said main plasticizing chamber and said melt receiving chamber.

8. In plasticizing apparatus, in combination, a cylinder structure of heat conducting material having a main passage extending axially therethrough with an intake opening coaxial therewith at one end and a discharge opening coaxial therewith at the opposite end; said cylinder structure having therein a plurality of flow channels spaced radially outwardly from, spaced apart around and extending longitudinally along said main passage substantially throughout the length thereof from locations immediately adjacent said intake opening to locations spaced a distance inwardly from said discharge opening; each of said flow channels being formed of a bore of circular cross section throughout the length thereof progressively, constantly increasing in internal diameter from the end thereof adjacent said intake opening to the end thereof spaced inwardly from said discharge opening; said cylinder structure closing the ends of said channels adjacent said intake opening of said cylinder and the ends thereof spaced inwardly from said discharge opening being open for discharge therethrough; and said cylinder structure also having therein a multiplicity of radially disposed small diameter openings closely spaced apart along the inner side of each of said channels throughout the length of the latter in communication between said passage and said channels.

9. Plasticizing apparatus including, in combination, a cylinder body of heat conducting material having a bore of substantially constant internal diameter extending axially therethrough with an intake opening through one end and a discharge opening through the opposite end thereof; a sleeve member of heat conducting material mounted in and extending through said bore; said sleeve member having an exterior form of substantially constant external diameter complementary to and tightly fitting in said bore in heat transfer engagement with said cylinder body; said sleeve member having a length substantially less than the length of said bore and extending therethrough from a location immediately adjacent said intake opening to a location at the opposite, inner end thereof spaced a substantial distance inwardly from said discharge opening; said sleeve member having a plasticizing chamber extending axially therethrough with an intake opening through the end thereof adjacent said intake opening in said cylinder body and a discharge opening at the opposite end thereof into said bore through said cylinder body; said sleeve member having flow channels therein spaced radially outwardly from, spaced apart around and extending longitudinally along said plasticizing chamber throughout substantially the length thereof; each of said flow channels being formed by a bore of circular cross section throughout its length progressively constantly increasing in internal diameters from the end thereof adjacent said intake opening to an enlarged diameter circular section end thereof at said discharge from said plasticizing chamber; said channels having the said enlarged diameter ends thereof open and discharging into said bore; said sleeve member having a multiplicity of relatively small diameter holes therein relatively closely spaced apart along the inner side of each of said channels throughout the lengths thereof extending radially through said sleeve member placing said channels in communication with said plasticizing chamber of said sleeve member; and said plasticizing chamber being tapered radially inwardly at a constant angle of taper between said intake end thereof and said reduced diameter discharge end thereof within said bore of said cylinder body.

10. Plasticizing apparatus including, in combination, a plasticizing cylinder structure of heat conducting material having an intake opening through one end and an injection discharge opening through the opposite end; said plasticizing cylinder structure having a main plasticizing chamber therewithin extending axially from said intake opening to a location at its opposite end spaced a substantial distance inwardly from said injection discharge opening; said main plasticizing chamber at said intake opening being coaxial and in communication with the latter and at its opposite end having a coaxial opening therethrough of substantially reduced diameter relative to the diameter of said intake opening; said main plasticizing chamber being tapered radially inwardly at a substantially constant angle of taper from said intake opening to said reduced diameter opposite end opening; said cylinder structure providing therewithin a melt receiving chamber having a maximum internal diameter greater than the diameter of said reduced diameter end opening of said main plasticizing chamber; said cylinder structure having therein a plurality of flow channels spaced radially outwardly from, spaced apart around and extending longitudinally along said main plasticizing chamber through substantially the length of the latter; said cylinder structure also having therein a multiplicity of radially disposed, small diameter openings therethrough relatively closely spaced apart along each of said channels throughout the lengths of the latter placing said flow channels in communication with said main plasticizing chamber; a flow distributing member mounted in and coaxial with said melt receiving chamber extending therein between said reduced diameter opening of said plasticizing chamber and said injection discharge opening from said plasticizing cylinder structure; said distributing member having maximum external diameters throughout its length less than the maximum internal diameters of said melt receiving chamber forming an annular flow passage around said distributing member extending between the inner discharge ends of said flow channels and said injection discharge opening from said cylinder structure; said distributing member closing the open reduced diameter end of said main plasticizing chamber; said cylinder structure closing the ends of said flow channels adjacent the intake opening of said plasticizing chamber; said multiplicity of openings constituting the sole discharge openings from said main plasticizing chamber to said flow channels; and said flow channels constituting the sole communication between said main plasticizing chamber and said annular flow passage formed in said melt receiving chamber around said distributing member.

11. As a new article of manufacture, a melt extractor sleeve member for mounting in the bore of a plasticizing cylinder, said sleeve member having melt flow channels therein extending longitudinally along, spaced apart around and opening at their outer sides through the outer side of said sleeve member, said sleeve member having a relatively narrow and shallow depth groove formed in and opening through the outer side thereof along and in immediate proximity to each side edge of each of said flow channels at the opening of the latter through said sleeve member; relatively thin flange walls formed by said grooves along opposite sides of each flow channel, and said flange walls along each flow channel being curved inwardly toward each other to form the underside surface thereof along the outer side of each flow channel on a radius providing rounded edges within and along opposite sides of each flow channel at the opening thereof through said sleeve member.

References Cited in the file of this patent

UNITED STATES PATENTS

| | | |
|---|---|---|
| 2,680,880 | Corbett | June 15, 1954 |
| 2,724,146 | Smith | Nov. 22, 1955 |
| 2,895,167 | Paggi | July 21, 1959 |